(12) United States Patent
Glew

(10) Patent No.: US 8,266,412 B2
(45) Date of Patent: Sep. 11, 2012

(54) HIERARCHICAL STORE BUFFER HAVING SEGMENTED PARTITIONS

(75) Inventor: Andrew Forsyth Glew, Hillsboro, OR (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 11/932,864

(22) Filed: Oct. 31, 2007

(65) Prior Publication Data

US 2008/0133883 A1    Jun. 5, 2008

(51) Int. Cl.
    *G06F 9/44* (2006.01)
(52) U.S. Cl. .......................... 712/220; 712/32
(58) Field of Classification Search .............. 712/220, 712/32
    See application file for complete search history.

(56) References Cited

U.S. PATENT DOCUMENTS

| | | | |
|---|---|---|---|
| 5,379,428 A | 1/1995 | Belo | |
| 5,592,679 A * | 1/1997 | Yung | 712/23 |
| 5,613,126 A | 3/1997 | Schmidt | |
| 5,644,784 A | 7/1997 | Peek | |
| 5,694,589 A | 12/1997 | Glew et al. | |
| 5,701,439 A * | 12/1997 | James et al. | 703/17 |
| 5,701,508 A | 12/1997 | Glew et al. | |
| 5,708,843 A | 1/1998 | Abramson et al. | |
| 5,717,882 A | 2/1998 | Abramson et al. | |
| 5,721,855 A | 2/1998 | Hinton et al. | |
| 5,721,857 A | 2/1998 | Glew et al. | |
| 5,724,527 A | 3/1998 | Karnik et al. | |
| 5,724,536 A | 3/1998 | Abramson et al. | |
| 5,727,176 A | 3/1998 | Clift et al. | |
| 5,729,728 A | 3/1998 | Colwell et al. | |
| 5,740,393 A | 4/1998 | Vidwans et al. | |
| 5,748,937 A | 5/1998 | Abramson et al. | |
| 5,749,084 A | 5/1998 | Huck et al. | |
| 5,751,983 A | 5/1998 | Abramson et al. | |
| 5,751,986 A | 5/1998 | Fetterman et al. | |
| 5,751,996 A | 5/1998 | Glew et al. | |
| 5,778,245 A | 7/1998 | Papworth et al. | |
| 5,778,407 A | 7/1998 | Glew et al. | |
| 5,796,637 A | 8/1998 | Glew et al. | |
| 5,809,271 A | 9/1998 | Colwell et al. | |
| 5,819,079 A | 10/1998 | Glew et al. | |

(Continued)

OTHER PUBLICATIONS

Computer Architecture: A Quantitative Approach, 2nd Edition, Chapter 3—Pipelining, by David A. Patterson and John L. Hennessy with a contribution by David Goldberg and Xerox Palo Alto Research Center; Morgan Kaufmann Publishers, Inc, Jan. 1996.*

(Continued)

*Primary Examiner* — Idrisss N Alrobaye

(57) ABSTRACT

A hierarchical store buffer included in a hierarchical microprocessor includes a plurality of execution clusters. An embodiment of a hierarchical store buffer includes a first-level store buffer configured to receive data values to be written to a memory subsystem from the plurality of execution clusters and store the received data values prior to writing the data values to the memory subsystem and a plurality of second-level store buffers each operatively coupled with the first-level store buffer, each second-level store buffer being included in a respective execution cluster. In the embodiment, the second-level store buffers each are configured to receive data values to be written to the memory subsystem from one or more execution units of the respective execution cluster and store the received data values prior to copying the data values to the first-level store buffer, where the first-level store buffer and the second-level store buffer are collectively configured to copy the stored data values to the first-level store buffer.

22 Claims, 13 Drawing Sheets

U.S. PATENT DOCUMENTS

| | | | |
|---|---|---|---|
| 5,826,094 | A | 10/1998 | Colwell et al. |
| 5,826,109 | A | 10/1998 | Abramson et al. |
| 5,835,748 | A | 11/1998 | Orenstein et al. |
| 5,852,726 | A | 12/1998 | Lin et al. |
| 5,854,914 | A | 12/1998 | Bodas et al. |
| 5,860,154 | A | 1/1999 | Abramson et al. |
| 5,872,972 | A | 2/1999 | Boland et al. |
| 5,881,223 | A | 3/1999 | Agrawal et al. |
| 5,881,262 | A | 3/1999 | Abramson et al. |
| 5,909,696 | A | 6/1999 | Reinhardt et al. |
| 5,913,050 | A | 6/1999 | Boggs et al. |
| 5,933,840 | A | 8/1999 | Menon et al. |
| 5,935,240 | A | 8/1999 | Mennemeier et al. |
| 5,948,097 | A | 9/1999 | Glew et al. |
| 5,950,211 | A | 9/1999 | Shealy |
| 5,951,670 | A | 9/1999 | Glew et al. |
| 5,956,753 | A | 9/1999 | Glew et al. |
| 5,974,523 | A | 10/1999 | Glew et al. |
| 6,035,393 | A | 3/2000 | Glew et al. |
| 6,047,369 | A | 4/2000 | Colwell et al. |
| 6,079,014 | A | 6/2000 | Papworth et al. |
| 6,117,079 | A | 9/2000 | Brackett et al. |
| 6,170,997 | B1 | 1/2001 | Glew et al. |
| 6,185,221 | B1 | 2/2001 | Aybay |
| 6,204,174 | B1 | 3/2001 | Glew et al. |
| 6,297,843 | B1 | 10/2001 | Glew |
| 6,374,349 | B1 | 4/2002 | McFarling |
| 6,378,062 | B1 | 4/2002 | Abramson et al. |
| 6,427,206 | B1 | 7/2002 | Yeh et al. |
| 6,430,191 | B1 | 8/2002 | Klausmeier et al. |
| 6,505,283 | B1 | 1/2003 | Stoney |
| 6,581,151 | B2 | 6/2003 | Henry et al. |
| 6,629,175 | B1 * | 9/2003 | Manning et al. ............. 710/200 |
| 6,647,482 | B1 | 11/2003 | Ronen et al. |
| 6,678,816 | B2 | 1/2004 | Ronen et al. |
| 6,792,523 | B1 | 9/2004 | Glew et al. |
| 6,820,086 | B1 | 11/2004 | Iacobovici et al. |
| 6,829,764 | B1 | 12/2004 | Cohen et al. |
| 6,873,184 | B1 | 3/2005 | McMinn et al. |
| 7,000,097 | B2 | 2/2006 | Senter et al. |
| 7,024,555 | B2 | 4/2006 | Kozuch et al. |
| 7,035,988 | B1 | 4/2006 | Marino |
| 7,124,273 | B2 | 10/2006 | Glew et al. |
| 7,130,990 | B2 | 10/2006 | Brekelbaum et al. |
| 7,133,906 | B2 | 11/2006 | Price et al. |
| 7,149,882 | B2 | 12/2006 | Glew et al. |
| 7,343,513 | B1 | 3/2008 | Basu et al. |
| 7,362,765 | B1 | 4/2008 | Chen |
| 7,844,797 | B2 | 11/2010 | Senter et al. |
| 2001/0042188 | A1 * | 11/2001 | Tremblay et al. ................ 712/11 |
| 2002/0044563 | A1 * | 4/2002 | Magill et al. ................... 370/411 |
| 2002/0083307 | A1 | 6/2002 | Sager et al. |
| 2002/0120663 | A1 * | 8/2002 | Binns ........................... 709/103 |
| 2002/0194464 | A1 | 12/2002 | Henry et al. |
| 2003/0084346 | A1 | 5/2003 | Kozuch et al. |
| 2003/0088756 | A1 | 5/2003 | Vishkin |
| 2003/0126442 | A1 | 7/2003 | Glew et al. |
| 2003/0126453 | A1 | 7/2003 | Glew et al. |
| 2003/0126454 | A1 | 7/2003 | Glew et al. |
| 2003/0147410 | A1 | 8/2003 | Hsu et al. |
| 2003/0163662 | A1 | 8/2003 | Glew et al. |
| 2003/0196065 | A1 | 10/2003 | Ronen et al. |
| 2003/0229794 | A1 | 12/2003 | Sutton, II et al. |
| 2004/0003321 | A1 | 1/2004 | Glew et al. |
| 2004/0073653 | A1 | 4/2004 | Hunt et al. |
| 2004/0117539 | A1 | 6/2004 | Bennett et al. |
| 2004/0163083 | A1 | 8/2004 | Wang et al. |
| 2004/0210741 | A1 | 10/2004 | Glew et al. |
| 2004/0225872 | A1 | 11/2004 | Bonanno et al. |
| 2005/0038977 | A1 | 2/2005 | Glew et al. |
| 2005/0058149 | A1 * | 3/2005 | Howe ............................ 370/428 |
| 2005/0080934 | A1 | 4/2005 | Cota-Robles et al. |
| 2005/0204118 | A1 * | 9/2005 | Jen et al. ........................ 712/225 |
| 2005/0210472 | A1 | 9/2005 | Accapadi et al. |
| 2006/0075402 | A1 | 4/2006 | Neiger et al. |
| 2006/0112388 | A1 | 5/2006 | Taniguchi et al. |
| 2006/0143373 | A1 | 6/2006 | Jain et al. |
| 2007/0030277 | A1 | 2/2007 | Prokopenko et al. |
| 2007/0083735 | A1 * | 4/2007 | Glew ............................. 712/214 |
| 2007/0083739 | A1 | 4/2007 | Glew |
| 2008/0052500 | A1 | 2/2008 | Glew |
| 2008/0133868 | A1 | 6/2008 | Glew |
| 2008/0133885 | A1 | 6/2008 | Glew |
| 2008/0133889 | A1 | 6/2008 | Glew |
| 2008/0133893 | A1 | 6/2008 | Glew |

OTHER PUBLICATIONS

Computer Organization and Design, The Hardware/Software Interface, 3rd Edition, Appendix B, The Basics of Logic Design by David A. Patterson and John L. Hennessy Morgan Kaufmann Publishers, INC, Aug. 2, 2004.*

International Search Report for PCT Patent Application No. PCT/US06/33662, mailed Oct. 10, 2007, 3 pages.

Evers, M. et al., "Using Hybrid Branch Predictors to Improve Branch Prediction Accuracy in the Presence of Context Switches", (May 1996), 3-11.

Gonzalez, J. et al., "Control-Flow Speculation Through Value Prediction for Superscalar Processors", IEEE Computer Society, 50 (12), (Dec. 2001),1362-1376.

Gochman, et al., "The Intel Pentium M Processor: Microarchitecture and Performance", http://developer.intel.com/technology/itj/index.htm, Intel Technology Journal, 07(02), (May 21, 2003), 21-36.

Lai, C. et al., "Improving Branch Prediction Accuracy with Parallel Conservative Correctors", (May 2005),334-341.

Jacobsen, E. et al., "Assigning Confidence to Conditional Branch Predictions", IEEE Computer Society, (Dec. 1996),142-152.

Heil, T. H., et al., "Improving Branch Predictors by Correlating on Data Values", IEEE Computer Society, (Nov. 1999), 28-37.

Chang, P. et al., "Alternative Implementations of Hybrid Branch Predictors", IEEE Computer Society, (Nov. 1995),252-257.

Stokes, Jon "Introduction to Multithreading, Superthreading and Hyperthreading", http://arstechnica.com/articles/paedia/cpu/hyperthreading.ars/1, (Oct. 3, 2002),18 pgs.

Glew, Andrew "MLP yes! ILP no!—Memory Level Parallelism, or why I no longer care about Instruction Level Parallelism", ASPLOS 98 WACI session (article), (Oct. 9, 1998),1 pg.

Glew, Andrew "MLP yes! ILP no!—Work on memory level parallelism. Stop worrying about IPC.", ASPLOS 98 WACI session (presentation slides), (Oct. 9, 1998),8 pgs.

Tang, Zhizhong et al., "GPMB - - - Software Pipelining Branch-Intensive Loops", IEEE Microarchitecture 1993, (1993), pp. 21-29.

Hieb, Robert et al., "Representing Control in the Presence of First-Class Continuations", Proceedings of the ACM SIGPLAN 1990 conference on Programming language design and implementation, ISBN: 0-89791-364-7,(Jun. 20-22, 1990), pp. 66-77.

Marr, Deborah T., et al., "Hyper—Threading Technology Architecture and Microarchitecture", Intel Technology Journal Q1, 2002, (2002),12 pgs.

McFarling, Combining Branch Predictors; Western Research Laboratory, WRL Technical Note TN-36, (Jun. 1993),1-25.

Chang, P. Y., et al., "Branch Classification: a New Mechanism for Improving Branch Predictor Performance", International Journel of Parallel Programming, (1994),1-10.

Office Action for U.S. Appl. No. 11/215,835, filed Oct. 10, 2006.
Office Action for U.S. Appl. No. 11/215,835, filed Feb. 7, 2007.
Office Action for U.S. Appl. No. 11/215,835, filed Jun. 11, 2007.
Office Action for U.S. Appl. No. 11/215,835, filed Sep. 12, 2007.
Office Action for U.S. Appl. No. 11/215,833, filed Sep. 19, 2007.

Jimenez, et al., "The Impact of Delay on the Design of Branch Predictors", International Symposium on Microarchitectures, (2000), pp. 1-10.

UK Intellectual Property Office Examination Report Under Section 18(3); App. No. GB0805594.9; Mar. 19, 2010; pp. 1.

Brekelbaum, Edward et al.; "Hierarchical Scheduling Windows"; Proceedings of the 35th Annual IEEE/ACM International Symposium on Microarchitecture (MICRO-35); bearing a date of 2002; pp. 27-36; IEEE Computer Society.

Brekelbaum, Ned et al.; "Hierarchical Scheduling Windows (HSW)"; Microprocessor Research Intel Labs; printed on Mar. 30, 2010; Intel.

* cited by examiner

HIERARCHICAL STORE BUFFER HAVING SEGMENTED PARTITIONS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC§119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/215,833, entitled Hierarchical processor, naming Andrew Glew as inventor, filed 29 Aug. 2005, which is currently co-pending, or is an application of which a currently co-pending application is entitled to the benefit of the filing date.The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

There are a wide variety of microprocessors available, and these may use different microarchitectures.

DETAILED DESCRIPTION

I. General Description of Example Processor Microarchitectures

Figure 1:
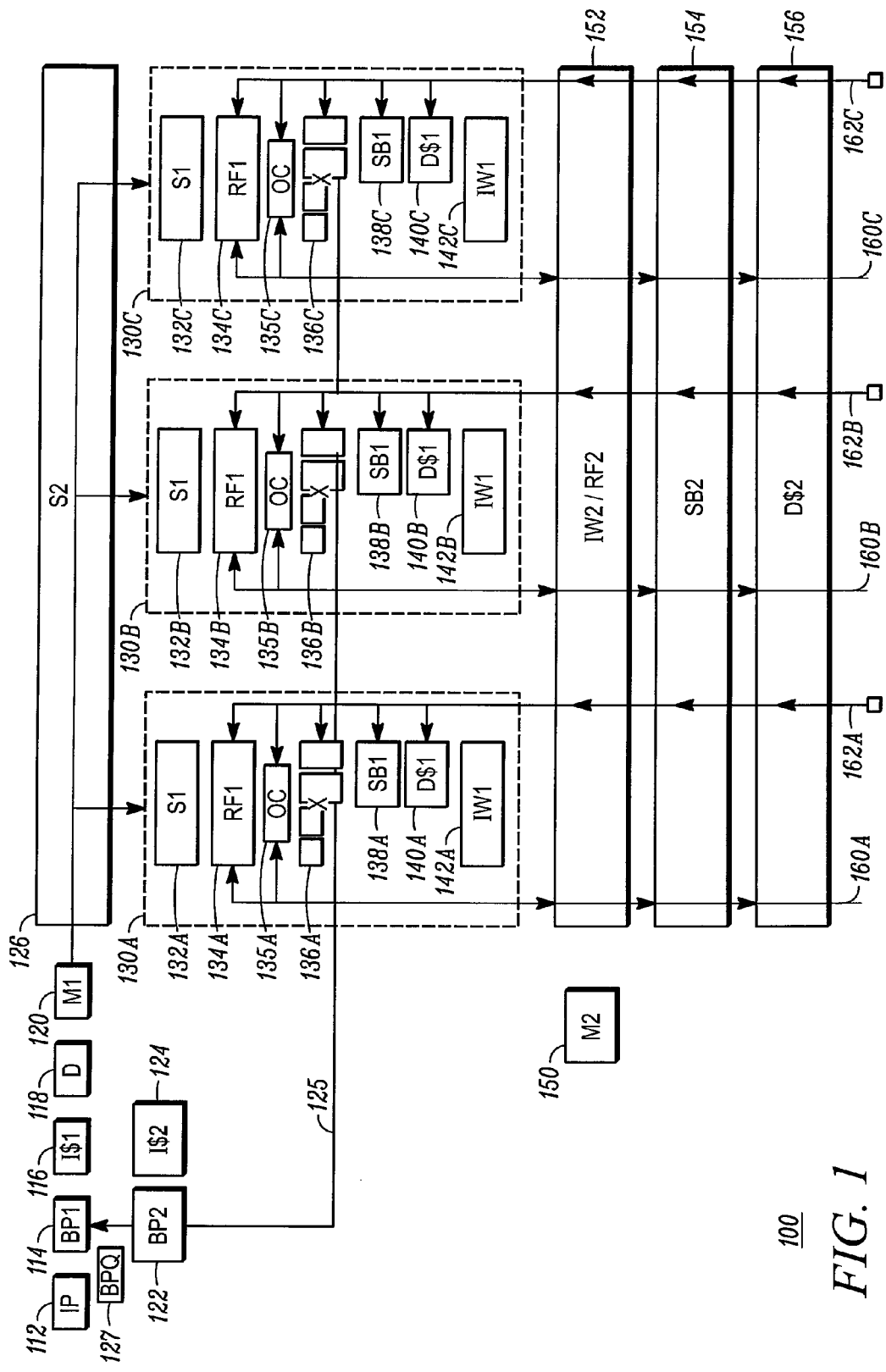
FIG. 1 is a block diagram illustrating an instruction pipeline of a processor 100 according to an example embodiment.

Referring to the Figures in which like numerals indicate like elements, FIG. 1 is a block diagram illustrating an instruction pipeline of a processor 100 according to an example embodiment. According to an example embodiment, processor 100 may be hierarchical or may include one or more stages that may be multilevel. In an example embodiment, one or more pipeline stages may be grouped into a cluster (or execution cluster). Processor 100 may include multiple parallel clusters, with, for example, one or more stages being replicated in each cluster to provide parallel processing paths.

Referring to FIG. 1, an instruction pipeline of processor 100 may include a number of pipeline stages. One or more of the pipeline stages may include multiple structures or may be multilevel. Processor 100 may include an instruction fetch unit (not shown) to fetch instructions and an instruction pointer (IP) 112 to provide an address of the next instruction to be decoded. Processor 100 may include one or more branch predictors to predict whether a branch will be taken, such as a level 1 branch predictor (BP1) 114 and a level 2 branch predictor (BP2) 122, and a branch predictor queue (BPQ) 127. Processor 100 may also include one or more instruction caches to cache or store instructions, such as a level 1 instruction cache (I$1) 116 and a level 2 instruction cache (I$2) 124. An instruction decoder 118 may decode architectural instructions into one or more micro-operations or micro-ops (uops). It will be recognized to one skilled in the art that the term uop and instruction are being used interchangeably, since some microprocessors (e.g. recent Pentiums) will translate instructions into simpler forms (i.e. uops) while others (e.g. PowerPC) will not require any such translation. The concepts disclosed in this work will apply equally well to either approach, with the only required difference being the existence of a more complicated decode stage.

Processor 100 may include a mapper (or register renamer), such as a level 1 mapper (M1) 120 and/or a level 2 mapper (M2) 150 to map architectural (or virtual) registers to physical registers. One or more instruction schedulers may generally schedule micro-ops (uops) for execution, for example, when operands for an instruction are ready and the appropriate execution resources are available. According to an example embodiment, the scheduler may be a single scheduler or may include a multilevel scheduler (or multiple schedulers), such as level 2 scheduler (S2) 126 and one or more level 1 schedulers (S1) 132.

According to an example embodiment, processor 100 may include one or more clusters in parallel, with each cluster including one or more pipeline stages. In an example embodiment, the pipeline stages for each cluster may be replicated or duplicated for each of the multiple clusters to provide parallel processing paths. In the example processor shown in FIG. 1, processor 100 may include one or more clusters 130, such as clusters 130A, 130B and 130C. While three clusters are shown in the example processor of FIG. 1, any number of clusters may be used and the clusters may be heterogeneous.

Referring to FIG. 1, cluster 130A may include a level 1 scheduler 132A, a level 1 register file (RF1) 134A, an operand capture array (OC) 135A to capture and provide operands to an execution unit, one or more execution units 136A to execute micro-ops (uops) (or other types of instructions), a level one store buffer (SB1) 138A to store data to be written to memory, a level 1 data cache (D$1) 140A to cache or store data and a level 1 instruction window (IW1) 142A which may assist with early stages of retirement of micro-ops (uops). The other clusters 130B and 130C may similarly include one or more stages. For example, cluster 130B may include one or more of: a level 1 scheduler 132B, a level 1 register file 134B, an operand capture array 135B, an execution unit(s) 136B, a level 1 store buffer 138B, a level 1 data cache 140B and a level 1 instruction window 142B. Similarly, cluster 130C may include, for example, one or more of: a level 1 scheduler 132C, a level 1 register file 134C, an operand capture array 135C, an execution unit(s) 136C, a level 1 store buffer 138C, a level 1 data cache 140C and a level 1 instruction window 142C.

Each cluster 130 (e.g., either 130A, 130B or 130C) may include the stages shown in FIG. 1, or may include a different set of stages, or may include only a subset of such stages shown in cluster 130 in FIG. 1. For example, in one embodiment, cluster 130A may include level 1 scheduler 132A, level 1 register file 134A, execution units 136A and a level 1 data cache 140A. For example, cluster 130A may or may not include stages such as the operand capture array 135A, level 1 store buffer 138A and a level 1 instruction window 142A. In another example embodiment, cluster 130A may include a level 1 scheduler 132A, a level 1 register file 134A and execution units 136A. Many other combinations may be used for the clusters 130.

Therefore, the stages or structures provided within each cluster may be considered a per-cluster structure. For example, one or more of the level 1 schedulers (S1) 132, the level 1 register file (RF1) 134, operand capture array (OC) 135, execution units 136, the level 1 store buffer (SB1) 138, the level 1 data cache (D$1) 140 and the level 1 instruction window (IW1) 142 may be provided for each cluster (or provided on a per-cluster basis).

In addition, one or more of the stages (or structures) provided within a cluster 130 may be part of a multilevel structure, where a first level (level 1) of the structure is provided on a per cluster basis and a second level (level 2) of the structure is provided for multiple clusters or for all clusters (provided as an inter-cluster structure). For example, a multilevel scheduler may be provided that includes a level 1 scheduler (S1) 130A, 130B, or 130C (provided on a per-cluster basis) and an inter-cluster level 2 scheduler (S2) 126 provided for multiple (or even all) clusters.

Also, a multilevel register file may include a level 1 register file (RF1) 132A, 132B, 132C provided per-cluster, and an inter-cluster level 2 register file (RF2) 152, for example. A multi-level store buffer may include, for example, a level 1 store buffer (SB1) 138A, 138B, 138C provided per-cluster (for each cluster), and an inter-cluster second level (L2) storage buffer (SB2) 154 provided for multiple or all clusters. Level 2 register file 152 may store execution results for instructions, which may be made available as operands for other instructions. Level 2 register file 152 may also include a level 2 instruction window that may handle retirement of instructions.

A multilevel data cache may include a per-cluster first level (L1) data cache (D$1) 140A, 140B, 140C and an inter-cluster level 2 data cache (D$2) 156. A multilevel instruction window may include a per-cluster first level (L1) instruction window (IW1) 142A, 142B, 142C, and an inter-cluster level 2 instruction window (IW2) which may be provided, for example as part of the level 2 register file 152.

The use of a multilevel stage allows, for example, a smaller and/or faster structure to be provided within the cluster that may be closer to the execution unit 136, while providing a larger and possibly slower structure for the stage to be used by multiple (or all) clusters. This multilevel structure may allow certain time-sensitive tasks to be placed in smaller or faster structures located near the execution units to improve processing or execution speed while allocating other tasks to other larger structures that may be common to multiple clusters.

In addition, according to example embodiments, as noted above, the branch predictor, instruction cache and mapper stages may also be multilevel, and may each include both a per-cluster structure and an inter-cluster structure (not shown in FIG. 1), or, for example, may include multiple inter-cluster structure (e.g., as shown in the example of FIG. 1).

The example features and operation of the stages of the example processor 100 in FIG. 1 will now be described in more detail. The instruction pointer (IP) 112 may identify or point to the location in memory from which a next instruction may be fetched. According to an example embodiment, level 1 branch predictor 114 may predict whether a branch instruction exists at that location and if the branch is taken and may write the address of the branch instruction and the prediction into the branch predictor queue 127. Level 2 branch predictor 122 may read predictions out of the branch predictor queue 127 and verify them. In an example embodiment, level 1 branch predictor 114 may be a relatively fast branch predictor, while level 2 branch predictor 122 may be larger and slower, but more accurate than predictor 114. Branch predictors 114 and 122 may verify or check the accuracy of their branch predictions based on execution results received via line 125, for example. Branch predictors 114 and 122 may be any type of branch predictors.

Processor 100 may also include one or more instruction caches to cache instructions. For example, instructions may be initially stored or cached in level 1 instruction cache 116 and written through to the level 2 instruction cache 124, for example. A least recently used (LRU) algorithm or other caching algorithm may be used to manage the instructions stored in the instruction caches 116 and 124. The instruction caches 116 and/or 124 may be any type of instruction cache, such as a cache for architectural instructions, a decoded instruction cache (or micro-op cache), a trace cache, etc. Instruction decoder (D) 118 may be coupled to the instruction caches 116 and/or 124 to decode architectural instructions into one or more micro-operations (micro-ops or uops), for example.

An allocation of resources may be performed for each decoded uop (e.g., by level 1 mapper 120 or other structure or stage, which may or may not be shown in FIG. 1). This allocation of some resources may include, for example: allocating for each uop, an entry in the level 2 register file to store the execution result for the uop. The entry in the level 2 register file 152 for the uop may also include a field indicating the status of the uop. The different status for a uop that may be tracked in its entry in the register file 152 may include, for example: uop is scheduled for execution, uop is executing, uop has completed execution and results are being written back to the register file entry, uop is ready for retirement, and uop is being retired. This allocation may be performed by an allocator stage (not shown, which could be provided just before mapper 120, for example), or by another stage such as the level 1 mapper 120.

The mapper (or register renamer) in processor 100 may be a single structure or may be multilevel. According to an example embodiment, processor 100 may include a limited set of architectural registers (e.g., eax, ebx . . . ) that may be seen or accessed by a programmer. Processor 100 may include a larger set of physical registers, shown as the level 2 register file (a portion of which may be cached by the level 1 register file 134 and/or the operand capture array 135). A uop may include multiple fields, e.g., fields that specify two source operands and a destination operand. Each of these operands or fields may reference one of the architectural registers. According to an example embodiment, level 1 mapper 120 may associate each of the uop fields that reference an architectural register with a register in the level 2 register file 152. Level 1 mapper 120 may store or maintain a register alias table (RAT) or map showing the mapping of architectural registers to physical registers (e.g., registers in the level 2 register file 152).

As new uops are received at level 1 mapper 120, a physical register in the level 2 register file 152 is allocated for the uop's execution result, and the uop's register operands may be mapped to point to the appropriate physical registers in the level 2 register file 152. An updated map is generated, and older maps, representing previous states (e.g., earlier in the uop stream) of physical to architectural register mappings may also be stored in the level 1 mapper 120, or may be moved to level 2 mapper 150.

According to an example embodiment, processor 100 may accommodate a single thread, and may accommodate multiple threads or multi-threading. A thread may include a basic unit of programming. Threads and clusters (130) may be related. Multiple parallel threads may share (or execute over) a cluster. One thread may execute over multiple clusters. In addition, processor 100 may implement a policy wherein there is thread affinity for each cluster, that is, where processor 100 may, where possible, allocate one thread per cluster, although this is not required. A thread may migrate from one cluster to another cluster, and a first thread may spawn (or fork) a second thread, which may be provided over a separate cluster, for example.

According to an example embodiment, a single instruction scheduler may be used. According to another embodiment, a multilevel scheduler may be used, such as a combination of inter-cluster level 2 scheduler (S2) 126 and a level 1 scheduler (S1) 132 for each cluster (e.g., scheduler 132A for cluster 130A, scheduler 132B for cluster 130B, and scheduler 132C for cluster 130C).

Level 2 scheduler 126 may perform several tasks. Scheduler 126 may implement a policy to assign threads or individual uops to clusters according to a specific criteria or policy. For example, level 2 scheduler 126 may assign a first thread to cluster 130A, a second thread to cluster 130B and a third thread to cluster 130C. Alternatively, scheduler may implement a load balancing policy where the scheduler 126 allocates uops in order to approximately balance the uop load across the available clusters, e.g., to provide greater processing throughput or more efficiently use the available processing resources. Level 2 scheduler 126 may also forward each uop to a selected cluster (a selected level 1 scheduler) based on the policy, such as load balancing or thread affinity, or some other policy. Each uop, for example, may include a thread ID that identifies the thread the uop is associated with. Level 2 scheduler 126 may forward each uop to a cluster based on the thread ID for the uop (e.g., assigning one thread per cluster).

As another example, when a first thread, assigned to a first cluster, spawns a second thread, scheduler 126 may assign the second thread to a second cluster. Thereafter, the uops associated with the spawned thread may be forwarded by scheduler 126 to the second cluster, while uops associated with the original thread may continue to be forwarded to the first cluster, for example.

In an example embodiment, level 2 scheduler 126 may store operand status information for each uop indicating when each of the source operands for the uop are available and ready for execution. Level 2 scheduler 126 may forward a uop to a level 1 scheduler after the source operands for the uop are available, or level 2 scheduler 126 may speculatively forward a uop to level 1 scheduler before operands are ready. In an example embodiment, level 2 scheduler may forward uops to a level 1 scheduler in groups, such as in groups of three uops, four uops, five uops, etc. A group of uops forwarded by scheduler 126 to a selected cluster may include a group of uops that include dependency chains between uops in the group. For example, if level 2 scheduler 126 detects that one or more source operands of a first uop are now ready, level 2 scheduler 126 may forward that first uop to a level 1 scheduler and one or more additional uops that may be dependent upon the first uop or that may be dependent upon the same operands detected as ready, or that may be related to the first uop, etc. These are merely examples of features and operation the level 2 scheduler 126 may perform, and the present disclosure is not limited thereto.

Each level 1 scheduler 132 (e.g., 132A, 132B and 132C) may receive uops from the level 2 scheduler 126. Each level 1 scheduler 132 may also maintain operand status information for each uop it receives indicating when each of the source operands for the uop are available and ready for execution. In an example embodiment, each level 1 scheduler 132 may schedule or dispatch each individual uop for execution when execution resources (e.g., required execution units 136) are available and operands for the uop are ready, for example. Alternatively, level 1 schedulers 132 may speculatively dispatch uops to execution unit 136 for execution even if the source operands are not yet ready.

Each cluster 130 may include an execution unit (X) 136 (e.g., execution unit 136A for cluster 130A, execution unit 136B for cluster 130B and execution unit 136C for cluster 130C). Each execution unit 136 may include, for example, two arithmetic logic unit (ALU) execution units and two memory execution units, although any number and arrangement of execution units may be used. The memory execution units may include, for example, a memory store (memory data write) execution unit to perform memory stores and a memory load (memory read) execution unit to perform memory loads.

A multi-level store buffer may be used, which may include, for example, the inter-cluster (or shared) level 2 store buffer (SB2) 154, and a per-cluster level 1 store buffer (SB1) 138 (e.g., store buffer 138A for cluster 130A, store buffer 138B for cluster 130B and store buffer 138C for cluster 130C). Level 2 store buffer 154 may allow, for example, threads to be spread across multiple clusters, such as for thread migration. If the uop is a memory store instruction, an entry may be allocated (e.g., by level 2 scheduler 126 or a level 1 scheduler 132) in the selected cluster's per-cluster level 1 store buffer (SB1) 138 to store the data to be written to memory. According to an example embodiment, store values may be initially written to the associated level 1 store buffer (e.g., store buffer 138A for a store instruction in cluster 130A). Store values may be written from the level 1 store buffer 138 to level 2 store buffer 154 when there is space in the level 2 store buffer, e.g., as part of a write-through or other cache coherency algorithm to maintain consistency of the data between level 1 store buffers 138 and level 2 store buffer 154. An algorithm, such as a least recently used (LRU) or other algorithm may be used by level 1 store buffers 138 and level 2 store buffer 154 to manage the storage of data in the store buffers. When the store operation (memory write) is completed and that store uop has been retired, the data in the store buffers may be deleted and the associated entry in the level 1 store buffer 138 may be re-allocated to another memory store uop. According to an example embodiment, level 1 store buffers 138 may be smaller and faster store buffers, while level 2 (shared) store buffer may be larger than and possibly not as fast as the level 1 store buffers 138.

According to an example embodiment, a multilevel data cache may be used, such as a level 2 data cache (D$2) 156 shared by multiple (or all) clusters and a (per-cluster) level 1 data cache 140 for each cluster (e.g., data cache 140A for cluster 130A, data cache 140B for cluster 130B and data cache 140C for cluster 130C). The level 1 data caches 140 may, for example, be smaller and faster than the level 2 data cache 156. Data received by processor 100 from memory, e.g., in response to a memory load operation (memory read), is shown by line 162A (for cluster A memory loads), line 162B (for cluster B memory loads) and line 162C (for cluster C memory loads). The data received in response to the memory load operation (received via lines 162) may be input to the level 1 data cache 140 for the associated cluster, and then may be written through to the level 2 data cache 156, for example. The data from the memory load operation may also be input to the execution units 136 (such as the memory load execution unit) for the associated cluster.

According to an example embodiment, a single register file may be used. In another embodiment, a multilevel register file may be used. For example, a multilevel register file may include an inter-cluster (shared by multiple clusters or all clusters) level 2 register file (RF2) 152 and one or more per-cluster register files (such as level 1 register files, RF1, 134). The level 2 register file 152 may include a number of physical (alias) registers to store execution results. A register in the level 2 register file may be allocated for each uop to store the execution result for the uop. The per-cluster register files, such as a level 1 register file (RF1) 134, may be provided for each cluster (e.g., register file 134A for cluster 130A, register file 134B for cluster 130B and register file 134C for cluster 130C). In an example embodiment, the level 2 register file and the per-cluster level 1 register files 134 may provide a two-level register file. In such case, the level 1 register file 134 may store and provide operand values to execution units 136 including immediate literal values (from instructions), and register values obtained through a variety of mechanisms, including long standing register values which may have been previously read, bypassing of results just being written. The level 1 register file 134 may operate to store values recently written, and may be indexed in time, or may use a capture CAM (content addressable memory), e.g., associatively indexed by physical register number written.

According to another embodiment, a multilevel register file may be used that employs, for example, three levels, and may include, for example: inter-cluster level 2 register file 152, a per-cluster level 1 register file 134 and a per-cluster operand capture array 135 (including operand array capture 135A for cluster 130A, operand capture array 135B for cluster 130B and operand capture array 135C for cluster 130C). In this example embodiment, each operand capture array may store and provide operand values to execution units 136 including immediate literal values (from instructions), and register values obtained through a variety of mechanisms, including long standing register values which may have been previously read, bypassing of results just being written, and may operate to store values recently written. Operand capture array 135 may provide a relatively small and fast cache to store and provide operand values to execution units 136. These register values may also be cached or stored in the level 1 register file 134 of the same cluster (as the operand capture array 135) as well as the level 2 register file 152.

As shown in FIG. 1, execution results output from execution units 136 may be input via line 160A (cluster 130A), line 160B (for cluster 130B) and line 160C (for cluster 130C) to operand capture array 135 and the level 1 register file of the associated cluster. These values may be written to level 2 register file as well, either directly, or as a write-through from the level 1 register file 134 to the level 2 register file when values are written to the level 1 register file, for example.

Alternatively, execution results output from execution units 136 may be written to level 2 register file 152, and then sent from level 2 register file 152 to the level 1 register file 134 where it may update the values in its registers (if the input value matches a register it is storing). The execution results may also be input to the operand capture array 135 of the associated cluster to be stored in the operand capture array, e.g., if the operand capture array is looking for those results as an operand for another instruction or uop. The name of the register may be provided to level 2 scheduler 126 and/or the level 1 scheduler for the associated cluster so the schedulers may receive updated information as to which operands may be ready (e.g., to allow instruction scheduling decisions to be made).

According to an example embodiment a single level instruction window (or retirement stage) may be used, or a multilevel instruction window (or retirement stage) may be used. The instruction window may be generally responsible for handling retirement of uops. In a multilevel instruction window, for example, a (per-cluster) level 1 instruction window (IW1) may be provided for each cluster (instruction window 142A for cluster 130A, instruction window 142B for cluster 130B, instruction window 142C for cluster 130A). The level 1 instruction windows 142A may perform early services in retirement of uops. A shared level 2 instruction window (which may be provided as part of level 2 register file 152) may complete the retirement process for uops from all clusters, according to an example embodiment.

II. Further Examples of Some Multilevel Structures and Other Details

A. Example Multilevel Instruction Scheduler

According to an example embodiment, an instruction scheduler may keep or develop a set of candidate instructions within the instruction window and decide when each instruction (or uop) should be executed, although instruction schedulers may perform many functions and in a variety of different ways. According to an example embodiment, the instruction scheduler may be divided into two structures: a smaller (and thus typically faster) instruction scheduler that may typically be closer to the execution units, and a larger (and thus typically slower) instruction scheduler that is typically farther away from the execution units. These may be referred to as the level 1 (L1) and level 2 (L2) instruction schedulers (IS), although the concept generalizes to more levels of hierarchy.

Figure 2:
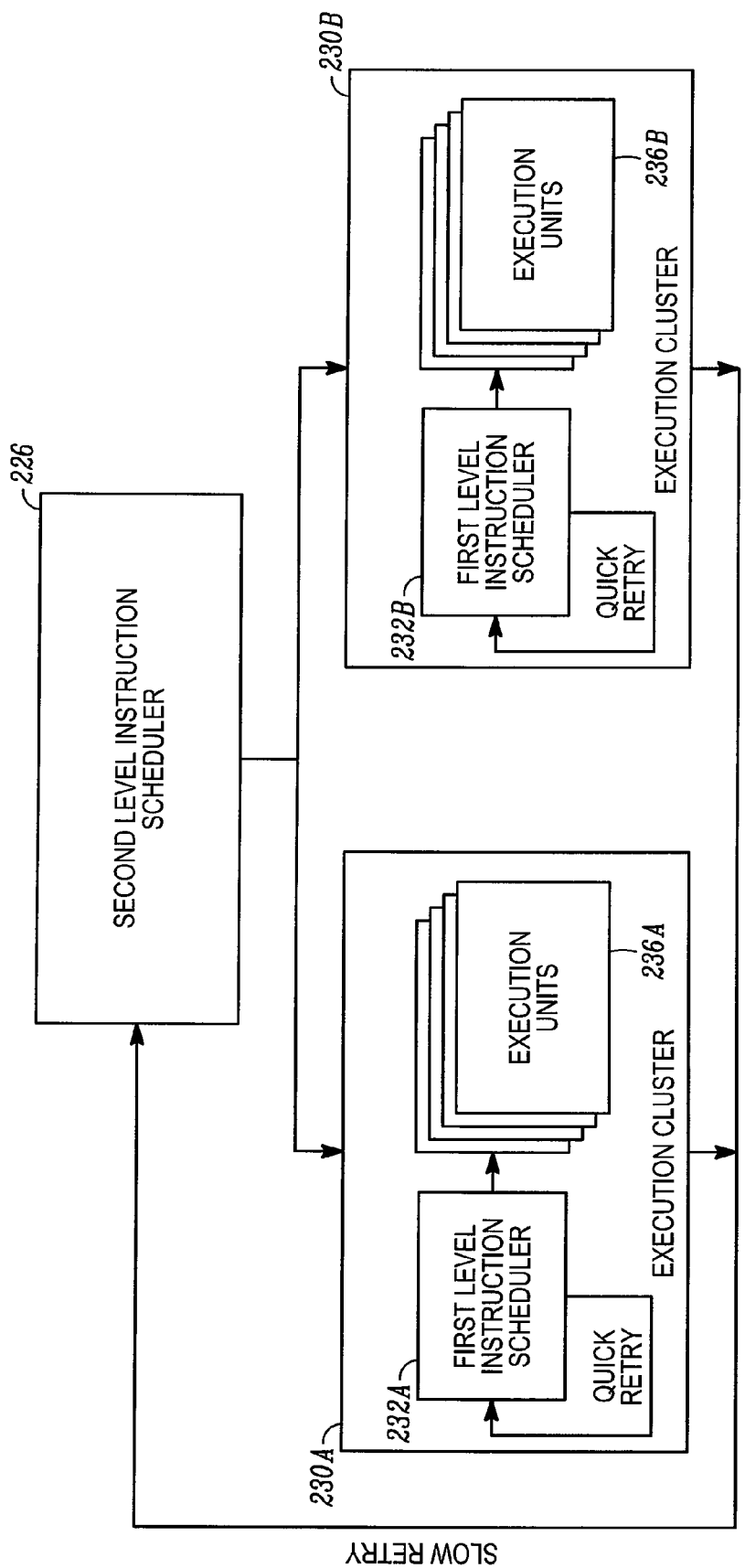
FIG. 2 is a block diagram illustrating a multilevel instruction scheduler according to an example embodiment.

FIG. 2 is a block diagram illustrating a multilevel instruction scheduler according to an example embodiment. Referring to FIG. 2, a level 2 instruction scheduler 226 is coupled to multiple clusters (or execution clusters), including clusters 230A and 230B. Although only two clusters are shown in this example, any number of clusters may be used. Each cluster may include a level 1 scheduler and one or more execution units. For example, cluster 230A may include a level 1 scheduler 232A and execution units 236A, while cluster 230B may include level 1 scheduler 232B and execution units 236B.

In an example embodiment, the level 1 schedulers and the level 2 scheduler may include a comparison circuit (or "picker") or a timing wheel circuit. For example, a picker may include a content addressable memory (CAM) port. The picker will have multiple entries (e.g., one entry per uop) and multiple CAM ports to detect when operands (or register values for one of the physical registers) for an instruction become available (e.g., new value for the register operand returned from execution units). For example, if the instruction scheduler has 32 entries, and each entry may have, for example, two inputs (source operands), and there are four execution unit results produced each clock cycle (one from each execution unit in the cluster), then the instruction scheduler may include 256 comparison circuits and four CAM ports corresponding to the four execution units. Each instruction or uop in the scheduler may identify the two source operands (or input physical registers). During each clock cycle, the comparison circuit for each instruction may check for a new result data that matches one of the inputs to one of the pending instructions. In this manner, the scheduler may keep track of when the source operands are ready for a number of different instructions or uops waiting to be scheduled for execution. The scheduler may dispatch or forward the instructions or uops for execution when the source operands for the instruction are ready and execution resources are available, for example.

A timing wheel circuit may control which instructions or uops will be executed using a different mechanism. In the exemplary timing wheel circuit, instructions are placed in a list, and may be positioned on the list based on when they are expected to be ready for execution (instructions may be speculatively scheduled). Therefore, in a timing wheel circuit, it may be possible to schedule instructions that are not yet ready to be executed but are expected to be ready in the future. The instruction buffer for a timing wheel may be a circular buffer, for example, where instructions that were not yet ready to execute when their time for execution occurred, may be automatically executed in the future after the wheel completes one rotation. A picker and a timing wheel circuit are merely two types of circuits that schedulers may use to schedule instructions for execution, and many other techniques may be used.

According to an example embodiment, the level 1 and level 2 schedulers may each use a picker circuit or a timing wheel circuit, or both. For example, a level 1 scheduler may include a picker circuit followed by a timing wheel. On the other hand, the level 2 scheduler 126 may include a timing wheel followed by a picker circuit. Also, the schedulers may include short cut circuits, for example if there is no entry in the level 1 scheduler timing wheel and a new instruction enters the level 1 scheduler, it is able to bypass the picker circuit. Similarly, the level 2 scheduler may be skipped if space is available in the level 1 scheduler.

Figure 3:
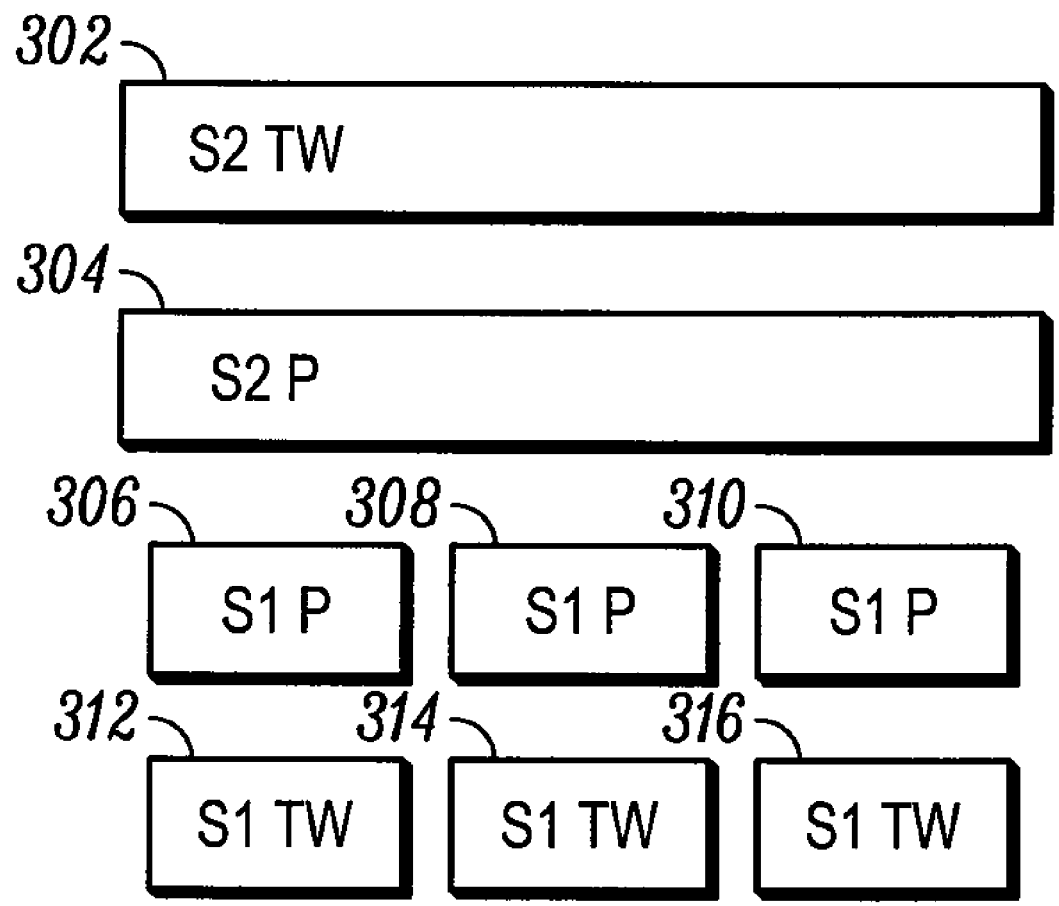
FIG. 3 is a block diagram illustrating a multilevel instruction scheduler according to an example embodiment.

FIG. 3 is a block diagram illustrating a multilevel instruction scheduler according to an example embodiment. A level 2 scheduler may include a timing wheel circuit 302 and a picker circuit 304. Each execution cluster may include a picker circuit and a timing wheel circuit. For example, a first cluster may include a picker circuit 306 and timing wheel circuit 312, a second cluster may include a picker circuit 308 and a timing wheel circuit 314, while a third cluster may include a picker circuit 310 and a timing wheel circuit 316. Furthermore, the clusters may be heterogeneous, with some having just pickers, others timing wheels, and others both.

In an example embodiment, a level 1 scheduler 132 may have 4 CAM ports, one for each of the 2 integer ALU and 2 load ports of the prototypical execution unit cluster. The level 1 scheduler may use picker circuits that fire or indicate to the scheduler when all operands for the uop are expected to be ready or when all operands for the uop are ready. A level 1 scheduler 132 may dispatch one uop at a time to the execution units 136, for example (or one uop per execution unit per clock cycle, where execution unit 136 may include 4 execution units).

In an example embodiment, the level 2 scheduler 126 may contain 16 partitions, each of 64 entries. Each entry may include 4 uops. Each entry may have 3 CAM ports. Each entry may specify a logic function to be satisfied by the input operands, such as (S1&S2&S3), any ready (S1|S2|S3), and any number of other logic functions, such as (S1&S2|S3). An entry is treated as ready when the logic function is satisfied, thereby indicating to the level 2 scheduler that the uop's operands are available and the uop may be dispatched for execution.

Alternatively, level 2 scheduler 126 (FIG. 1) may speculatively forward the group of instructions to a selected level 1 scheduler, i.e. before all operands (inputs) are ready. For example, if an instruction has two input (source operands), the uop can be forwarded from the level 2 scheduler to the level 1 scheduler whenever either of its inputs (or source operands) is available. This may be performed since the level 1 instruction scheduler may still track that dependence.

Multiple instructions (uops) may be grouped together before they are placed in the level 2 instruction scheduler. This group of uops or instructions may be related through a dependence chain, may be unrelated, or may be selected without regard to their dependence relationship (e.g. in the original program order). The level 2 scheduler may then forward the entire group to the level 1 scheduler whenever any of the inputs become available, which may indicate that some of the instructions within the same basic block (or group) have begun to execute and thus the rest of the instructions are good candidates to begin execution very soon. This is merely one example.

Therefore, according to an example embodiment, the level 2 scheduler 126 may perform rough or approximate scheduling, while the level 1 schedulers 132 may perform precise (or more precise) scheduling or dispatch of uops. For example, a level 2 scheduler 126 may schedule groups of uops, while level 1 schedulers 132 may schedule execution of individual uops. In an example embodiment, level 2 scheduler 126 may dispatch or forward a group of uops (or instructions) to a level 1 scheduler. The group of uops dispatched or forwarded to the level 1 scheduler may be a dependency chain of uops (e.g., a group of uops having some type of dependency relationship). This group of uops may be forwarded to the appropriate level 1 scheduler when only one (or some) of the group of uops are ready for execution, or where some operands for at least one uop in the group are ready (and the remaining uops being speculatively forwarded). For example, the level 2 scheduler may forward a group of 4 uops when only one of three operands or inputs for one of the uops is ready, or when one of the uops is ready to execute (e.g., all operands of the one uop being ready).

In this manner, circuitry for the level 2 scheduler may be reduced or simplified since fewer CAM ports may be needed for the level 2 scheduler.

Figure 4:
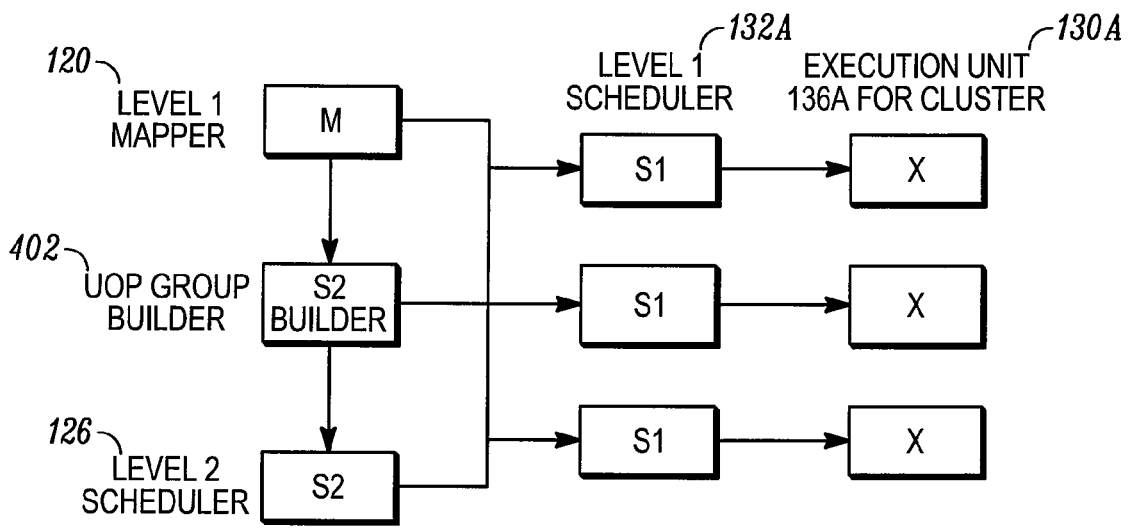
FIG. 4 is a block diagram that illustrates an example system.

The scheduling groups of uops for dispatch by the level 2 scheduler 126 may be built or group built by mapper 120, for example. FIG. 4 is a block diagram that illustrates an example system where a uop group builder 402 may build groups of uops to be dispatched or forwarded as a group to one of the level 1 schedulers, e.g., when a specific condition is met. For example, the group of 4 uops may be forwarded to a selected level 1 scheduler when one operand of the group is available, or when one uop (or instruction) of the group is ready for execution.

Figure 5:
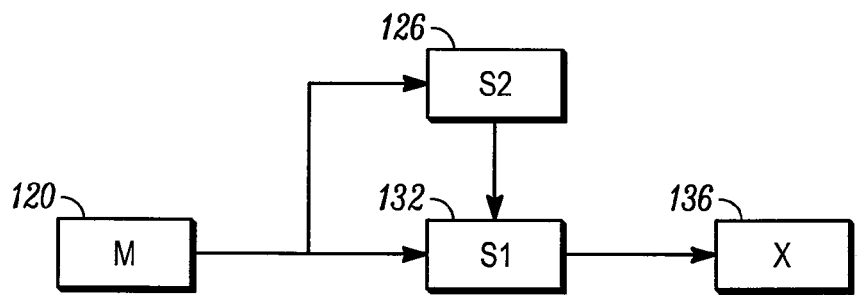
FIG. 5 illustrates an example embodiment where a level 2 scheduler is coupled in parallel with a level 1 scheduler.
Figure 6:
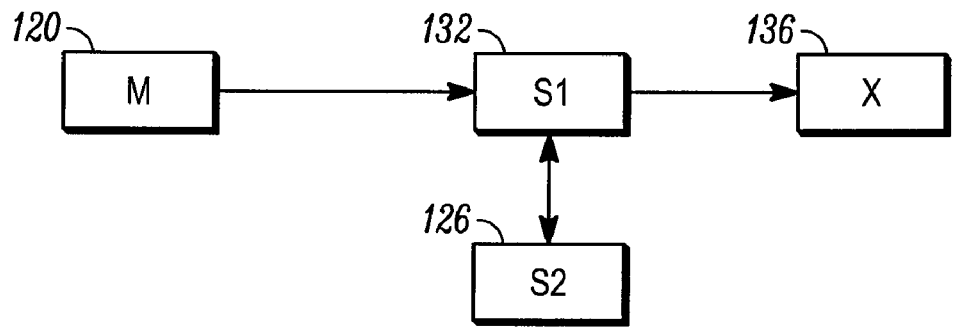
FIG. 6 is a block diagram where a mapper may be coupled directly to a level 1 scheduler as well, according to another example embodiment.

According to an example embodiment, the level 2 scheduler may be skipped if the appropriate level 1 scheduler is not full. FIG. 5 illustrates an example embodiment where the level 2 scheduler 126 is coupled in parallel with level 1 scheduler 132 to level 1 mapper 120. This may allow uops or instructions to be directly input to both levels of schedulers, and may facilitate skipping a level 2 scheduler if the level 1 scheduler is not yet full. FIG. 6 is a block diagram where mapper 120 may be coupled directly to level 1 scheduler 132 as well, according to another example embodiment.

According to an example embodiment, a large level 2 instruction scheduler 126 may be shared among multiple level 1 schedulers. This may allow clusters of execution units to be built and the level 2 scheduler space efficiently shared among them. This design is shown in FIG. 2, for example, for a system with two clusters. However, this approach generalizes to any number of clusters and their associated level 1 instruction schedulers. An example goal of having any private level 1 and shared level 2 structure, whether it be ordinary caches or the instruction schedulers in this design, may be to allow the smaller structures to be fast and near a place of need (such as near execution units), while allowing the larger structure to be shared efficiently. If one cluster requires a very large set of instructions in the active instruction window the shared level 2 structure can dynamically allocate it more entries. If the load is roughly equal among all clusters, then the level 2 structure can be shared equally. And, according to an example embodiment, the number of entries allocated in the level 2 structure (such as the level 2 instruction scheduler) for each cluster can change over time to reflect the changing dynamics or changing needs of executing programs.

According to an example embodiment, the level 2 instruction scheduler 126 may be physically partitioned. Each partition in the level 2 scheduler may be assigned to service a single (or different) level 1 instruction scheduler, and each level 1 instruction scheduler may be associated with multiple level 2 scheduler partitions. This assignment may be varied dynamically, and therefore, the partition size may be considered to be a granularity for resource allocation within the level 2 instruction scheduler for the multiple clusters. The benefit of this approach is that it greatly reduces the number of CAM ports that are needed for the L2 instruction scheduler. Each picker (or comparison) circuit may typically watch (or receive data from) the output of each execution unit. If a level 2 scheduler physical partition may hold instructions for multiple level 1 clusters, it should typically have a port to match the output of each execution unit from each cluster, according to an example embodiment. By associating each level 2 partition with one cluster rather than N (for an N cluster machine), the number of such ports may be reduced from N*M to M (for a cluster with M execution units).

According to an example embodiment, the schedulers (e.g., level 1 scheduler and/or level 2 scheduler) in processor 100 may sometimes speculatively schedule a uop for execution. That is, the scheduler may sometimes schedule a uop for execution before all of the conditions necessary for correct execution have been met (e.g., not all inputs or source operands are ready yet, but are expected to be ready soon). In such a case, the expectation or hope is that all the conditions necessary for correct execution will have been met by the time the uop is actually executed. If the conditions necessary for correct execution are not ready when the uop was executed, the uop must be re-issued for execution (re-executed), and this is often referred to as replay. Example causes of replays may include: cache misses, dependency violations, unforeseen resource constraints, etc.

According to an example embodiment, processor 100 may include a recovery scheduler, and may replay uops. Replays may be scheduled using the original scheduler, but operations awaiting long latency replays may be moved out of the critical level 1 schedulers into an auxiliary structure. Furthermore, there may be a scheduler circuit that cancels replay storms, a so-called anti-scheduler.

The replay storm anti-scheduler may catch up with a wavefront of operations scheduled on an event that turned out to have a replay by ensuring that the cancellation messages are faster than the original data-flow latency. First, anti-scheduling operations may have the lowest or lower latency: e.g. memory operations have the same 1 (or 0.5) cycle latency as ALU operations. However, this is not enough to guarantee catch-up: some degree of transitive closure is necessary. In a bitmap scheduler it is straightforward to compute the full transitive closure. In a tag based scheduler, transitive closure is more complex. Therefore, the anti-scheduler may, for example, be a larger, slower, bitmap scheduler. Operations may stay in this replay storm anti-scheduler until replay safe.

According to an example embodiment, the replay scheduler (replaying operations waiting for long latency events such as cache misses) and/or the replay storm anti-scheduler functionality may be placed into the level 2 scheduler, and shared between clusters.

B. Example Hierarchical Register Files

Read-after-Schedule may read the register file after an operation is dispatched from the scheduler; Capture (operand capture array) reads old values from the physical register file as an operation is placed into the scheduler, and "captures" new values as they are written back. Read-after-Schedule may require a large number of ports on the physical register file; the operand capture may require fewer.

According to an example embodiment, the register file port reduction may be significant because it is not necessary to read the entire register file, even for the Read-after-Schedule microarchitecture.

Read-before-schedule still has some applicability: the level 1 register file RF1 could be read before placing an operand into the scheduler, transferring the values to an operand storage array that is indexed by operation number (level 1 scheduler entry number) on dispatch.

In many microprocessors the register files tend to be large, slow, and consume significant power. The two major factors in sizing a register file are the number of entries, which we can call R, and the number of ports, which we can call P. A classic microprocessor that can execute at most a single instruction per clock, i.e. not superscalar, requires two read ports and one write port in order to support instructions such as "add r1, r2, r3". A simple approximation is that a superscalar processor that is able to issue N instructions per clock requires 3*N ports. In some cases, as the degree of concurrent execution increases, i.e. as the value of N increases, both the number of ports and physical registers may increase. In some cases, the physical silicon area of a register file may increase as $R*P^2$, the delay may increase as $P*R^{1/2}$, and the energy may increase as $R*P^2$, for example. These relationships are rules of thumb or estimates used for explanation, and the disclosure is not limited thereto.

One example technique for reducing the negative impact of such a register file is to use a register file cache. The idea, for example, may be to build a smaller cache memory (small cache register file) with all of the necessary ports to provide operand bandwidth to the execution unit, and a larger register file that sits behind the cache with fewer ports. Register accesses, for example, may be sent to the register cache, which is usually managed using some approximation of LRU, and cache misses are forwarded to the main larger register file for refills. Consequently, while the main register file is addressed directly using the physical register number as an index into a RAM structure, the cache register file may use CAMs to determine if it currently holds the value associated with a particular physical register. As long as enough of the accesses are satisfied by the fully ported cache register file there will little or no negative performance impact.

According to another example embodiment, another technique that may be used is a bypass cache (bypass register file). The term bypass in this example may be used to refer to the process of sending new data results produced by the execution units directly to the instructions waiting for them, rather than writing them to the register file and then having the dependent instructions read from the file. A bypass cache, for example, may hold the last several such values and may provide them directly to new instructions that enter the scheduler. This approach may, at least in some cases, reduce the total number of data writes to the large main register file, which may improve performance by providing the data earlier than it would otherwise be available.

According to another example embodiment, additional techniques may be used to acquire operands for instructions in processor 100. First, the operands may be read from the register file when the instruction is sent to the execution unit or the operands can be captured into some new structure, as they are produced, and then read out of this structure when sent to the execution unit.

According to an example embodiment, a three-level register file may be used. The example descriptions below relating to the multilevel register file are provided for 1 cluster (on a per-cluster basis), and may be replicated for each cluster. The level 2 register file (RF2) 152 may have a single entry (e.g., register) for each physical register in the micro-architecture. This register file may be addressed by the physical register file number, and it may be indexed, for example, as an ordinary RAM (random access memory) and thus the circuitry may be simpler than CAM circuits. The complications involving the level 2 (or main) register file may arise from two sources, for example. First, the level 2 (or main) register file 152 may be relatively large, for example, such as 80 entries and possibly more. Second, because the execution units may have high operand bandwidth requirements, it may be desirable for the level 2 (or main) register file 152 to have a relatively large number of ports if it is to directly provide operand values. A hierarchical register file may provide smaller structures with fewer registers and a large number of ports and place them closer to the execution units, which is to say where the data bandwidth is actually needed.

Figure 7:
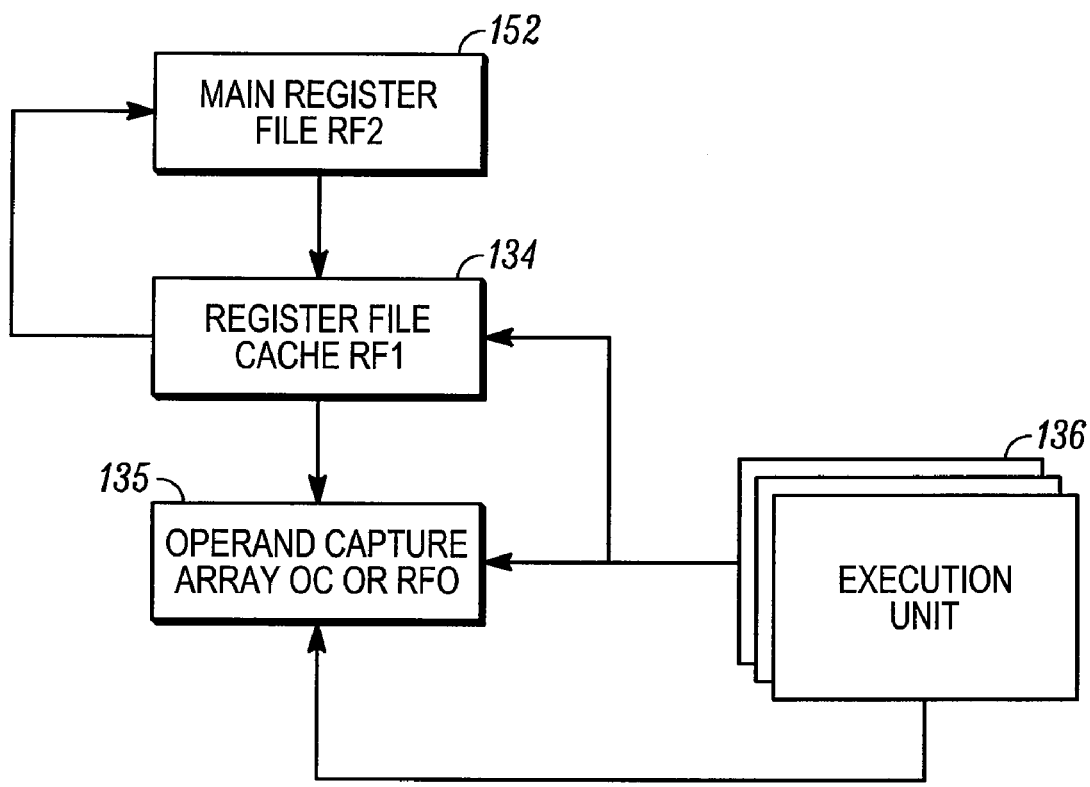
FIG. 7 is a block diagram illustrating a multilevel register file according to an example embodiment.

FIG. 7 is a block diagram illustrating a multilevel register file according to an example embodiment. Those structures that are closest to the execution unit may have the biggest impact on performance. The Operand Capture Array (OC) 135, which may be considered to be a level 0 register file, RF0, may provide operands directly to the execution units 136 (within its cluster). In an example embodiment, each instruction in the level 1 instruction scheduler (S1, FIG. 1) 132 has a corresponding entry in the OC 135 of the corresponding cluster, and the entry in the OC 135 for the uop may have the same index value as the uop in the level 1 scheduler so that the operand capture array 135 may be accessed as a fast RAM when instructions move to the execution units, for example. When an instruction enters the level 1 instruction scheduler 132, its operand data, if available, are written into the corresponding operand capture entry for the instruction, within the same (or corresponding) cluster (this may be done on a per-cluster basis). Each entry in the OC 135 may also have a set of CAMs which are used to capture operand data that was not ready when the instruction entered the level 1 instruction scheduler because it was being produced by an instruction that had not yet completed execution. When an instruction completes execution, the execution unit 136 may provide the new data result as well as the number of the physical register that must store the result. For each execution unit, the OC 135 matches the physical register number to be written against the physical register number of its unsatisfied inputs. When there is a match, the new data value is captured into the operand capture array 135. Thus there may be two types of write ports into the operand capture array 135, for example: a set which are indexed like a RAM using the level 1 scheduler entry number which are used when an instruction enters the level 1 scheduler (of the same cluster as the OC), and a set which are addressed using CAMs and the physical register number provided by the execution units. The size of the OC 135 may be a design parameter that is determined based on, for example, the size of the level 1 instruction scheduler 132 in the cluster.

In an example embodiment, the register file cache (level 1 register file 134 or RF1) may be accessed when instructions enter the level 1 scheduler (for this cluster) and instructions are allocated to the operand capture array 135. This may be before the instructions are scheduled and thus in advance of when they are required for the execution units. This approach has the benefit of detecting a cache miss in advance of when the data is actually needed, and taking the cache refill circuitry off of the main path used to move operands from the operand capture array 135 to the execution units 136. According to an example embodiment, the operand capture array 135 may therefore operate as a bypass cache. The operand capture array 135 and the level 1 register file 134 may be combined within a single register file (e.g., RF1), but this is not required and is merely a design choice.

The main register file, the level 2 register file (RF2, 152) may be used to provide backing storage and may hold all or substantially all of the register values, for example. However, it only needs to provide enough read bandwidth to satisfy the expected number of RF1 cache misses. Thus, the number of read ports can be reduced, in an example embodiment. Furthermore, data writes can be buffered (since the dependant instructions are being satisfied out of the operand capture array or the level 1 register file) in order to reduce the number of write ports to the expected steady state bandwidth rather than the worst case bandwidth.

According to an example embodiment, the large level 2 register file (RF2, 152) can be shared among multiple clusters, while each cluster has a dedicated OC 135 and level 1 register file (RF1, 134). In this approach, it may be beneficial for level 1 register file 134 to have a high hit rate, otherwise performance may suffer. One benefit of this sharing is that it allows threads (e.g., executing programs) to be moved from one cluster to another with the register file values being copied from RF2 to RF1 only when they are actually needed. This may help facilitate transparent thread migration from one cluster to another.

Other details and example embodiments relating to a multilevel register file will now be described. According to an example embodiment, the multilevel register file may include a level 1 register file (RF1) 134 (per-cluster) and a bypass cache, and this may be referred to as the operand acquisition subsystem. An RF1 may be read before scheduling, and an operand capture array (OC) 135 may be read after scheduling, according to an embodiment. According to an example embodiment, the level 1 register file, RF1, may be read before an operation is placed into the S1 scheduler. Values read out of RF1 may be transferred to the operand capture array (OC) 135 (within the same cluster). The operand capture array may be read after an operation is dispatched from the S1 scheduler. It is indexed by an S1 entry number.

Figure 8:
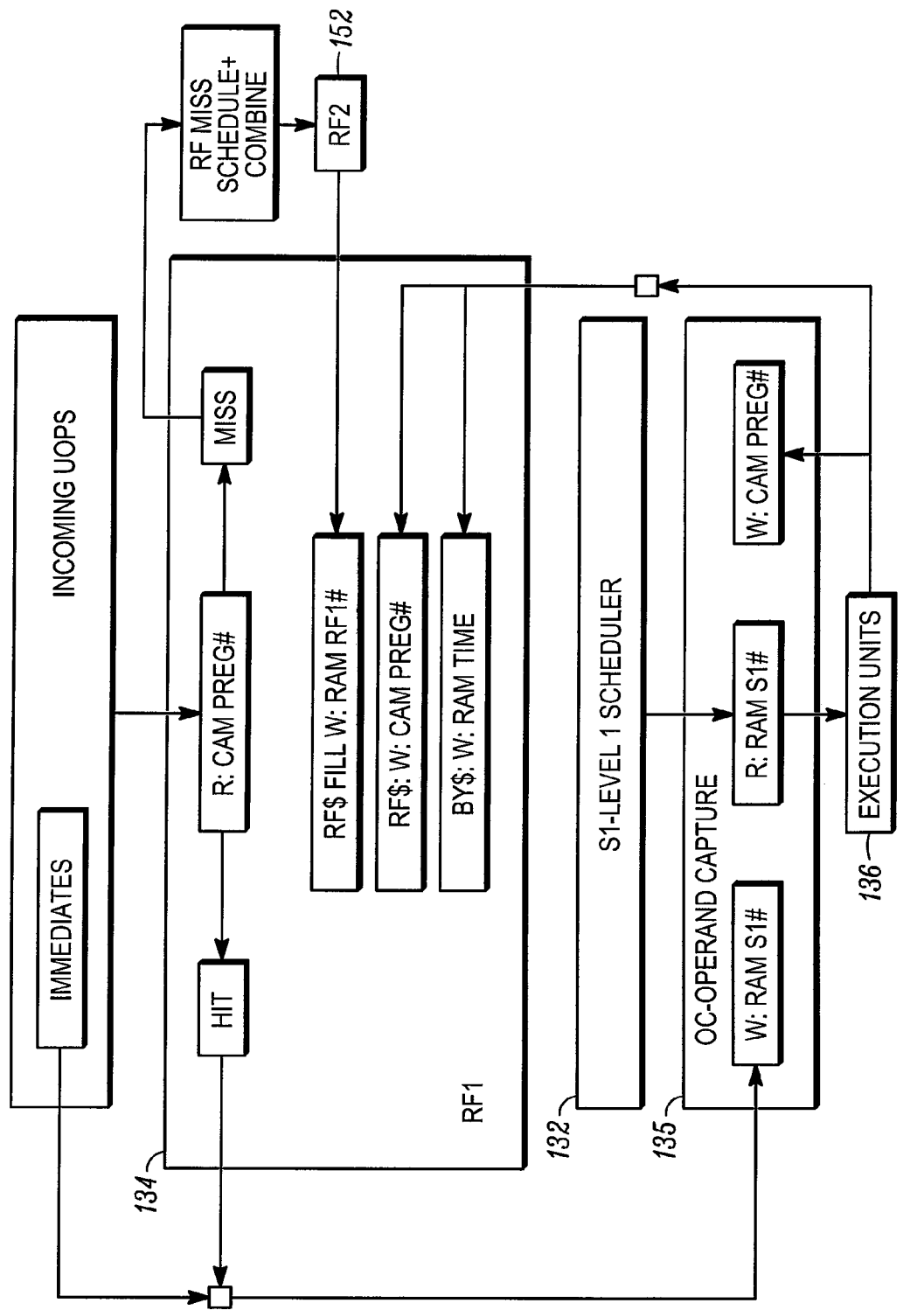
FIG. 8 is a block diagram illustrating a multilevel register file according to an example embodiment.

FIG. 8 is a block diagram illustrating a multilevel register file according to an example embodiment. The level 1 register file (RF1) may be CAM indexed by physical register number when read. RF1 can "miss", sending requests to RF2, the main physical register file.

Multiple RF1 miss requests can be combined, for example so that two instructions requesting the same register will only use a single read access port to RF2, thus using available resources more efficiently.

It will be understood by one skilled in the art that RF1 can be managed using any number of well known replacement policies, for example least recently used, pseudo least recently used, and random.

Part of RF1 is organized as a first-in-first-out (FIFO) memory, which may be known as a bypass cache. For example, an N entry bypass cache will hold the last N values produced by the execution units, allowing them to be provided to later instructions entering the scheduler and thus bypass the RF1/RF2 access mechanisms described above.

Level 1 register file (RF1) miss requests do not stall operation issue: instead, the operation is placed into the S1 scheduler with CAMs enabled for its operand capture entry, and the RF1 miss request is scheduled. When a RF1 miss request is completed the data is used to update the level 1 scheduler and operand capture array (OC) 135 (within the same cluster), and perform wakeups, exactly as normal.

RF1 fills may use a write port that is indicated by the diagram as being RAM indexed by RF1 number. For simplicity, this port could be eliminated and combined with the RF1 execution unit writeback port which may be CAM indexed by physical register number (preg#). In FIG. 8, execution unit writebacks may be sent to the RF1 and CAM indexed by preg#. RF1 entries may be pre-allocated in the case where the correct value is expected to be produced by an execution unit, thus guaranteeing that the RF1 write-back CAM ports (i.e. connected to the execution units) will match on a register entry. The bypass cache BY$ is written by a time index RAM port, but read by a preg# CAM port. The RF$ is read and written as described above.

According to an example embodiment, the RF1 (level 1 register file) may be a cache of the main register file (level 2 register file). Such cache (level 1 register file) may be CAM indexed at least partially—that is CAM indexing or tag matching—and that it can take a "miss" unexpectedly. For read-after-schedule, it is possible to have the array that is read after scheduling be RAM indexed. The contents of this post-schedule array are checked before an operation is placed in the scheduler, which may use a CAM; the post-schedule array, however, may not miss when it is read after scheduling. Here, the post-schedule array may be a non-cache RF1. The structure that is read before scheduling is really the dynamic cache of the RF2, but the pre-schedule structure described in this paragraph does not store data values, according to an example embodiment.

An alternate read-after-schedule arrangement may use CAMs to access the post-schedule array. In this scheme, the post schedule array may be a cache, RF$ (register file cache), capable of dynamic misses. (It is also possible to create a post-schedule CAM port, but to manage it so that dynamic misses do not occur.) With a multi-level scheduler there may be pre-S1 (level 1 scheduler) and post-S1 register file mechanisms. A structure of an operand acquisition micro-architecture, that includes a pre-schedule RF1$ (level 1 register file cache) and a post-schedule operand capture (operand capture array 135) structure, may have a number of advantages, for example:

Placing data in the pre-schedule structure allows larger RF1$ mechanisms to be used—a larger LRU cache, a larger bypass cache BY$—without unduly complicating the post-schedule array. These pre-schedule RF1$ mechanisms may have few ports, whereas the post-schedule array needs full ports.

Placing data in the pre-schedule structure allows alternatives such as an active register file to be used. E.g. branch misprediction recovery could recover register values as well as maps.

The post-schedule OC (operand capture array) may require only N entries, where N is the number of entries in the level 1 scheduler (S1). It may only require one RAM port per execution unit dispatch port, whereas other post schedule structures may use one port per operand per execution unit dispatch port, for example.

The main cost of the post-schedule OC (operand capture) is the CAMs on the writeback ports. These could be converted to RAM, by a combination of pre-allocating writes into the post-schedule level 1 register file (RF1), and generating new requests.

Mechanisms that rely on evanescent bypassing to reduce register file ports may exhibit positive feedback that reduces performance: if an operation is delayed, it may miss the opportunity to pick up a value from the bypass network; having been delayed, this increases the chances of subsequent operations being delayed, and so on. Fully-ported microarchitectures do not have such positive feedback, at the cost of area.

According to an example embodiment, the processor 100 may save area by not having full ports on the full physical register file/instruction window. Most of the physical register files (or file entries) may have only 1 or 2 ports. A multilevel register file architecture may be used, and may address potential positive feedback issues as follows, for example (these are merely examples and the disclosure is not limited thereto):

The pre-scheduler RF1 may cache miss, but does not usually block subsequent operations. The blocked operation is sent to the S1, and waits to capture its missing operand when the fill writes back. Consequently, RF1 misses do not delay subsequent but independent instructions. Furthermore, data values are allocated specific locations in the OC and (typically) are not removed until the instruction associated with them has executed.

Another example that may involve the least area is a data-full pre-scheduler RF1$ with a non-cache post-scheduler RF1, since it may be managed to not require many more entries. Many of the extra entries in a post-scheduler RF1 may be due to the different register file cache functionalities: LRU RF1$, BY$, etc. If those are moved to the pre-scheduler RF1, the post-scheduler RF1 entries would typically be retained until the corresponding uop has completely written back. The OC CAMs typically eliminate this consideration. According to an example embodiment, the Operand Capture array may have a CAM port for every operand associated with every uop, for example an x86 might have 2 source CAM ports plus a non-CAM port for immediate values extracted directly from the instruction.

The CAMs essentially allow an operation to send its result directly to waiting operations that were not present when the first operation started execution. These CAMs can be eliminated by having the operation write to a single location using RAM indexing. If writing into the post-scheduler level 1 register file (RF1), the use of RAM indexing means that this location must be preserved until writeback is complete.

Many of the CAMs may be unused or wasted, since many operations have a literal immediate constant as an operand; still more have at least one operand that was available well in advance, possibly at the time the operation was placed into the level 1 scheduler (S1). These immediate and early available operands do not need CAM ports for execution unit writeback: they could be placed in a separate array, or placed in the same array, except without the CAM ports.

However, according to an example embodiment, to improve performance, the possibility of more than 1 dynamic input may be captured on the fly, usually where there is no guarantee that an operand will be picked up on the bypass path. To enable a varying number of dynamic and static operands, may, at least in some cases, avoid some of the advantages of the OC (operand capture) array. For example, each operand may be indexed independently instead of a single access indexing by scheduler number.

In this approach, two different types of post-scheduler RF1 arrays may be implemented and both would be indexed by the operand number at the time the instruction is dispatched to the execution units. A first of the post-scheduler RF1 arrays, may be CAM indexed based on the execution unit output. A second of the post-scheduler RF1 arrays, containing static operands, would not be indexed on execution unit output. In many cases design tradeoffs would typically favor increasing the CAM ports, since static operands can almost always be stored in a CAM entry, but not vice versa.

However, the decoder per operand approach may have advantages that further reduce ports, e.g. by supporting instructions with an uncommonly large number of input operands (e.g. floating-point multiply accumulate, i.e. FMAC) without supporting all ports. Further still, if a timing wheel scheduler is used inside S1, it may be guaranteed that values are picked up on the bypass path.

Values may be transferred from one cluster to another, supporting process migration and forking (e.g., one thread spawning another thread). Also, a dedicated inter-cluster bypass network may be provided as well. If there is no dedicated bypass network, RF1 (register file 1) misses may be sent to the physical register file (e.g., level 2 register file) that is shared between clusters. If the physical register file (PRF) (e.g., level 2 register file) has the register value, it answers; if not, the level 2 register file (PRF) tracks which cluster produces the value. If the value is ready but not written to the level 2 register file, the PRF may send a request to the owning cluster, and then send a corresponding reply to the requester. If not yet ready, the PRF may send a request to the owning cluster that will eventually expedite write-through of the requested value, e.g., inter-cluster communication may be through the shared PRF (Physical register file) (such as level 2 register file), which may implement a directory that tracks which clusters are producing and requesting a value. Such a protocol may work best if values are immediately written through the physical register file (PRF) (such as level 2 register file), or if they are written behind.

C. Example Instruction Window

Additional details and embodiments are described relating to the level 2 register file. According to an example embodiment, the level 1 register file for each cluster may be a write-through structure. That is, execution unit writes of results are sent back to the cluster, and are also, for example, written-through to the level 2 register file (e.g., PRF). This may create a fairly high volume of write-through traffic: typically around 3 clusters and 4 execution ports giving 12 writes per cycle.

The level 2 register file (RF2) may, for example, be organized as a randomly allocated, mapped register file. Alternatively, the level 2 register file may be organized in the same style as an Intel Pentium P6 ROB/RRF (RRF stands for real register file in Intel parlance) that copies data on demand. According to an example embodiment, the RF2/PRF may contain the aforementioned randomly allocated register file array; it may also contain a re-order buffer (ROB) and RAT (register allocation table), which also serves as the map delta list, but the ROB may not necessarily include data), but rather, may provide only pointers to RF2/PRF registers that can be used to update the map.

In one configuration, the RF2/PRF is highly banked to support the high write-through bandwidth, with each bank having only a small number of write ports and read ports. Buffers allow write-through operations to be scheduled to avoid bank conflicts. According to an example embodiment, the level 2 register file (RF2) may include a full width write port for every execution unit for every cluster. The return path may be narrower: possibly only 1 path for return of RF2 (level 2 register file) values to RF1 (level 1 register file).

In some configurations or applications, some design considerations may favor reducing the bandwidth of the physical register file (e.g., level 2 register file, RF2). Some such considerations may include, for example (1) reducing hardware complexity, ports or (2) reducing power, even where full hardware bandwidth may be available.

According to an example embodiment, the processor 100 may rely on the level 1 register files (RF1) for each cluster to provide improved physical register file (PRF) read bandwidth and latency. It is useful therefore to discuss PRF write bandwidth considerations, as execution results are written from the execution units (136) to level 2 register file (RF2) and from level 1 register file (RF1) to the level 2 register file (RF2).

According to some aspects, the structure may be configured to reduce RF2 bandwidth. For example, write-through operations to RF2/PRF can be delayed until they are known to not be located in a replay wave front.

In one basic configuration, PRF (RF2) registers may be allocated in blocks sized according to the largest data value expected to be supported (e.g. 128 bits). Multiple smaller registers (e.g. 64 bit, 32 bit) are allocated in such a block, as they pass the allocation (mapper) pipestage. Buffering between the cluster execution unit writeback and the PRF (RF2) allows multiple small writes into the same 128 bit block to be gathered together. These buffers are sized sufficiently to allow throttling by stopping cluster S1 scheduling. In one aspect, PRF (RF2) can thus be considered to be segmented sequential, with really small segments.

In a more complex example, alternative RF1/RF2 arrangements may be implemented. For example, RF1 can accumulate sequentially adjacent blocks of registers, and write through to the RF2 together. This is most likely implemented in configurations where the RF2 is sequentially allocated.

In still another example, values that have been overwritten can be exempted from write-through operations. In an example of one design compatible with such an approach, the instruction window is divided into blocks, or batches and then only values that are read by other batches at the end of a batch are written through. This would typically be applied where RF2 is not sequentially allocated; although the approach may also apply where the IW contains batches rather than an entry for each operation.

According to an example embodiment, each cluster may be made free standing. That is, each cluster may include its own retirement logic (e.g., from IW2) and level 2 register file. In this manner, each execution cluster 130 may be made independent.

D. Example Pipelines and Replay

As noted above, the processor 100 may replay uops that were executed before all conditions or inputs for the uop were received. According to an example embodiment, replay may be implemented using a multilevel replay mechanism. For example, a first replay mechanism may be used only for infrequent events where it is acceptable to replay everything in the pipeline; a second replay mechanism proceeds through the (recovery) scheduler, replaying only dependent operations. Processor 100 may use age based scheduling wherever possible to avoid deadlocks or livelocks caused by replay. Also, a replay storm anti-scheduler may be employed that traverses the dataflow graph quicker than the wavefront of incorrect execution caused by an event such as a cache miss. This may prevent wasted work, such as a single replay causing all subsequent operations to be replayed.

There may be several different types of operation writebacks that may be used to wake up dependent operations or uops (and cause them to be dispatched for execution), including (but not limited to) indications that the data is known to be available, the data is believed to be available but has not yet been verified by error correction hardware or full cache validation, prior data is now known to be invalid (i.e. poisoned), and that a prior write back has completed safely.

According to an embodiment, a replay predictor may determine whether dependent operations should be scheduled with non-replay safe data available, or whether they should wait until replay safe.

E. Bypass Examples

According to an example embodiment, a bypass network may be used. Bypass networks may, for example, be latency homogeneous or latency heterogeneous, and/or bandwidth homogeneous or bandwidth heterogeneous. In many cases it may be undesirable to bypass every execution unit to every other execution unit in the same cycle and may be undesirable to be able to bypass the full bandwidth of all execution units to all other execution units, even with heterogeneous latency.

Figure 9:
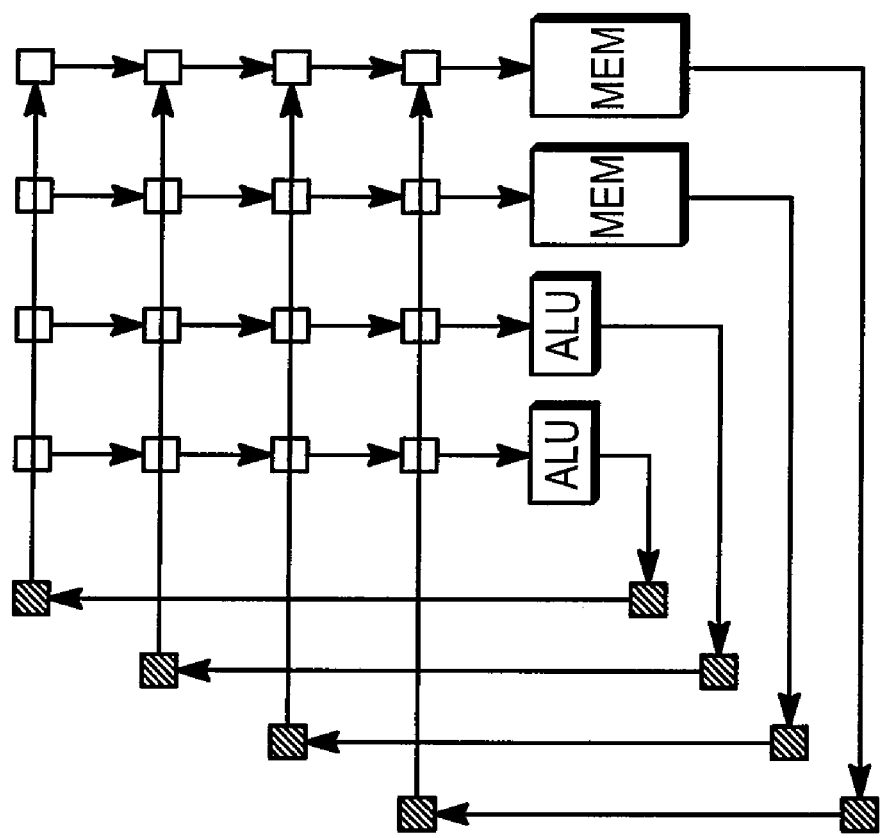
FIG. 9 illustrates an example embodiment of a bypass network.
Figure 10:
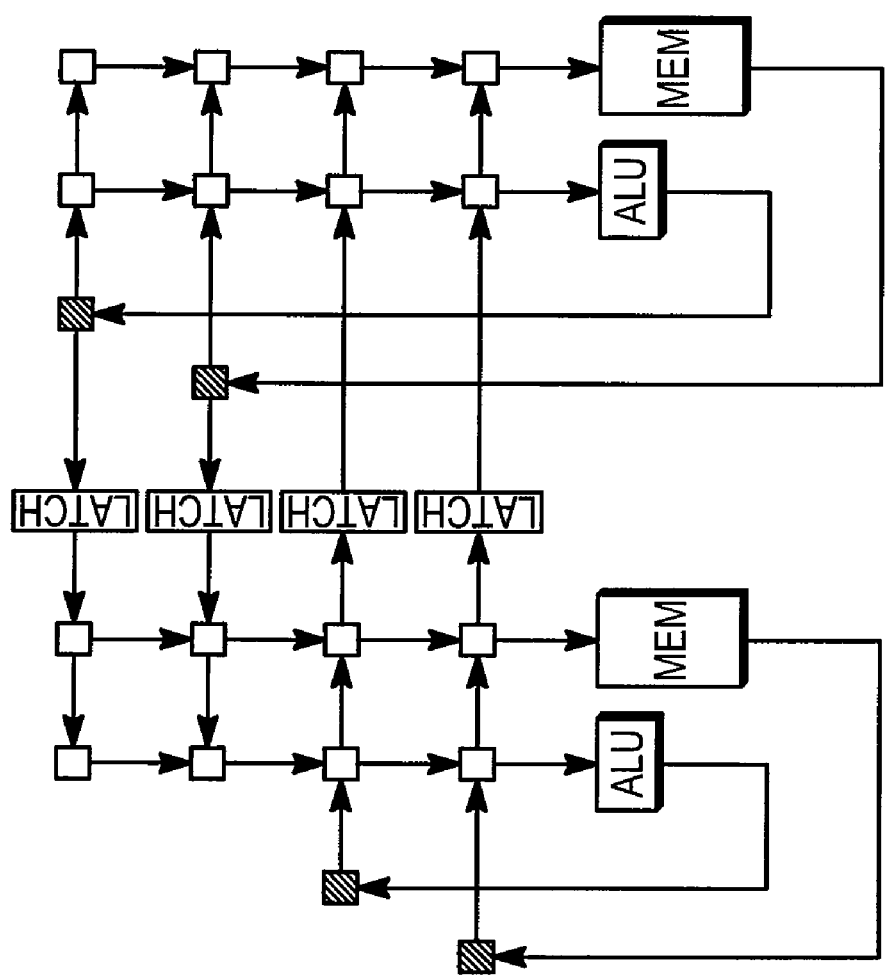
FIG. 10 is a block diagram illustrating a bypass network according to another example embodiment.

FIG. 9 illustrates an example embodiment of a full latency homogenous bypass network, that includes 4 execution units (2 ALU and 2 memory). This bypass circuit may be split into two bypass clusters, with additional latency between each cluster, and such a circuit is shown in FIG. 10. Such a configuration may be latency heterogeneous, but is still fully connected and, hence, is bandwidth homogeneous: for example, any execution unit may send results to any other execution unit, e.g., at its full bandwidth.

Generally, the system does not bypass every execution unit to every other execution unit in the same cycle, because the hardware cost would be excessive. In one aspect this means that the bypass network is both latency and bandwidth heterogeneous.

Bandwidth heterogeneous bypass networks may in some cases require storage or buffering, to handle time intervals when more results that need inter-cluster bypassing are created than there are wires available. Eventually backpressure may arise that stalls production of such inter-cluster bypassing. According to an embodiment, careful scheduling may eliminate the need for such buffering completely, but that may delay intra-cluster bypassing of the results as well as inter-cluster bypassing.

Figure 11:
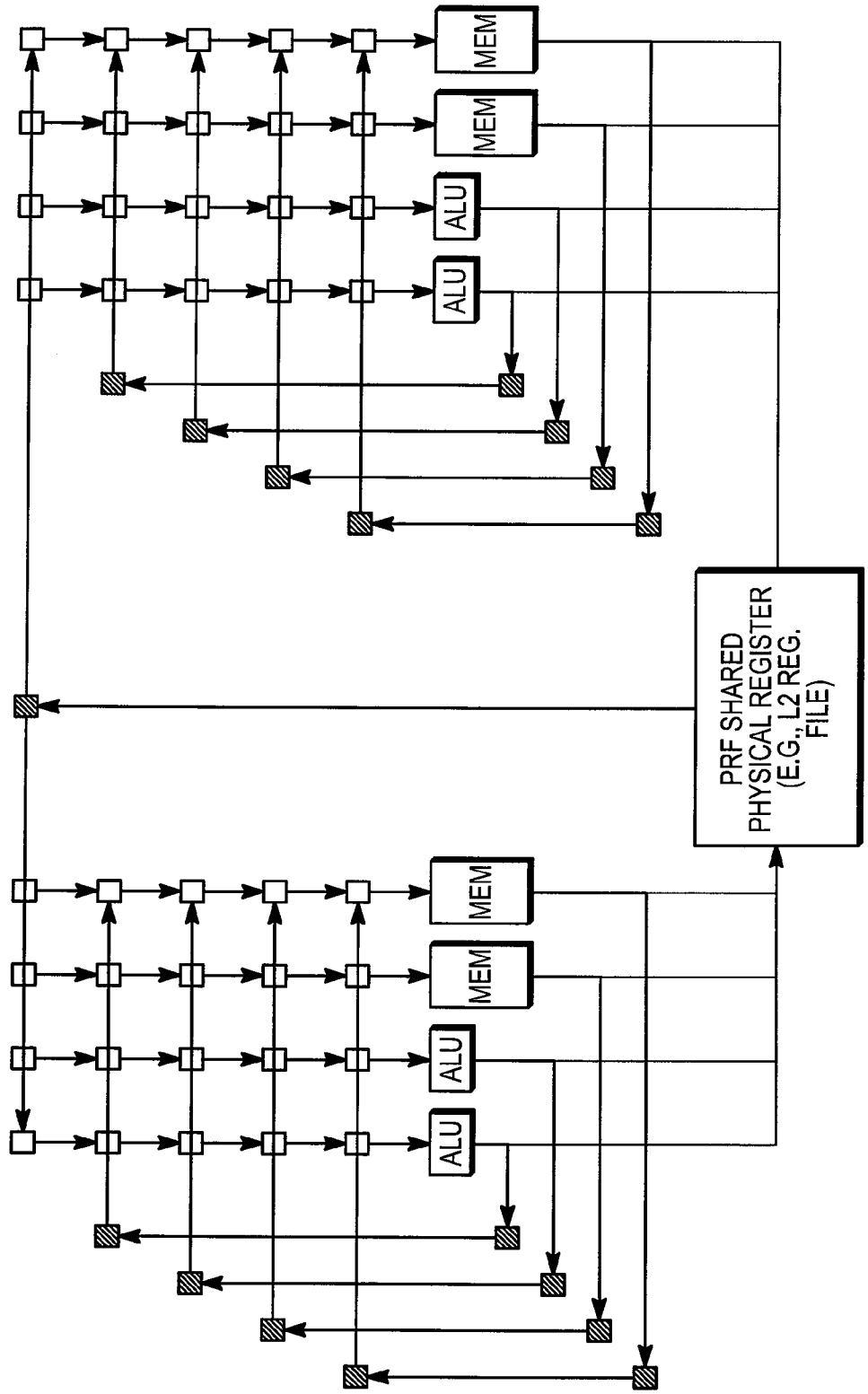
FIG. 11 illustrates a use of a level 2 register file to provide an inter-cluster bypass mechanism or inter-cluster communication according to an example embodiment.

Rather than create dedicated storage or buffering for inter-cluster bypassing, the processor 100 may use the existing physical register file mechanism. For example, using such a technique, there may not be an explicit or separate mechanism for inter-cluster bypassing, but inter-cluster communication may occur through a physical register file shared between clusters, such as the level 2 register file. FIG. 11 illustrates the use of a level 2 register file to provide an inter-cluster bypass mechanism or inter-cluster communication according to an example embodiment.

In an example embodiment, the level 2 register file may have, for example, a single port used for both reads and writes at the actual array cell. Banking may be used to provide pseudo-multiporting of both reads and writes.

A single set of wires returns the data values read to each cluster. In an embodiment, the same data return path used for inter-cluster communication of register values may also be used for return of memory values read from a data cache shared between clusters. (This path could also be used for inter-cluster store buffer forwarding.)

The circuit shown in FIG. 11 may also have arbitration logic to schedule a limited number of physical ports amongst a potentially larger number of register writes, and buffering for collisions.

In an example embodiment, the shared RF (e.g., level 2 register file) may track which cluster is producing a value, and which clusters require a value, which may involve for example:

a. If the value is present in the shared register file (RF), it is returned b. If the value is not present in the shared register file (RF), it sends a request to the producing cluster. This request may cause the value to be written through to the shared register file (RF), immediately if already ready, or eventually when produced. The shared register file may then forward replies back to requesting clusters.

According to an example embodiment, the inter-cluster bypass protocol/mechanism may be used even if there is no per-cluster register file (e.g., level 1 register file).

F. Examples Relating to Segmented Sequential Storage

In some cases, multithreading may cause problems for sequential data structures. Non-multithreaded sequential data-structures may, for example, be allocated as a circular queue. Multithreading may sometimes require replication of these circular queues. Replication of fixed size circular queues may be restrictive in some cases due to their fixed or static size.

According to an example embodiment, segments of storage, memory or other resources may be allocated in segments or chunks. This technique may be referred to herein as segmented sequential storage. For example, a portion of memory (or other resources) may be divided into segments. Objects (e.g., threads, clusters) may be allocated one or more segments or chunks of memory, e.g., sequentially.

According to an example embodiment, a segmented sequential approach may include dividing a very large buffer into segments. Allocation may be sequential within the segments. Segments may be allocated discontiguously, allowing dynamically changing resources, providing significant flexibility.

In an example embodiment, segments may be allocated randomly from within a heap, and then linked together using pointers stored either in the segments themselves or in an auxiliary data structure. There may be a pre-set (or discrete) size for each segment or chunk of memory to be allocated or, the segment size may be dynamically changed. A segment of memory (or other resources) may be (e.g., dynamically) allocated on demand or as needed to an object, e.g., to each thread or cluster.

According to an example embodiment, hardware (or hardware blocks in the processor) may be used to manage the segmented sequential storage, and additional circuits may be provided that allow computation. A segment of memory may be allocated for a thread or cluster circuitry may be provided to determine if the next storage operation will fill up (overflow) the current segment, or exhaust its data (underflow). Stored pointers that link one segment to its predecessor may be used to find the correct address in the enclosing heap. An additional segment may be automatically allocated or allocated on demand to the object (e.g., thread or cluster or other object).

For example, an executing program may place a store operation into the level 1 store buffer (SB1). At sometime later the store may be copied to level 2 store buffer (SB2). The hardware circuit that manages this copying may either put the store in SB2 or allocate a free segment and link it into the SB2 chain for the current thread (or current object). In an example embodiment, the executing program is not required to manage this process and typically has no ability to do so, or even observe the results (e.g., since storage buffer SB2 is typically invisible to the executing program). In addition, the entries in a segment of the segmented sequential storage do not need to be simple memory storage locations. For example, each entry in SB2 may be associated with an address comparator that is used to do the CAM functions.

For some uses there may be no inter-segment computation. E.g. the trace-log may be just ordinary RAM: the sequential allocation within a segment may be used to permit parallel, high bandwidth, read-out. The segment must be large enough for the bandwidth goals. Randomly allocated segments may be chained together using pointers; the segment length may be enough to hide the latency of de-referencing the next segment in the chain.

For other uses there may be inter-segment computation. In some applications the segments are given tags or CAMs, which allow randomly allocated segments to be placed in a dynamic order. Or, each segment computation may return a candidate; the segment tags may be used to reorder the candidates, and obtain the desired entry.

In other uses, timestamps or IDs may be compared relating to the position of an entry in the segmented sequential data structure. In this case, the segments can be allocated discontiguously, but still in a circular manner. E.g. according to an example embodiment, with a simple circular structure and a single wrap bit, new segments allocated to a thread could only be used if they are above the youngest and below the oldest, in the circular order; they cannot be used immediately if they are above the oldest and below the youngest, but must wait until the oldest advances. Multiple wrap bits allow quicker reuse, but the constraint still remains (although you could allocate enough wrap bits to totally eliminate the problem—doubling the size of the index).

G. Examples of Hierarchical Store Buffers

Store buffers typically reside between the microprocessor and the memory subsystem. Stores do not have to complete before dependent operations occur. In this way they are different from memory loads—if one instruction A loads a value from memory and instruction B uses that value, it may create a problem that delays the execution of A. On the other hand, if A stores a value to memory no instruction is explicitly waiting for that operation to complete. Therefore, it can be beneficial to put the store operations off to the side and let load operations have priority.

One problem with this approach is that instruction B can be dependant on the value stored by a prior instruction A through an implicit relationship, i.e. they happen to refer to the same memory location, though that relationship may not be apparent until the program executes, and in fact the dependence may not exist for all executions of A and B but only some, based on other data values. If A is responsible for storing a value to memory and a subsequent instruction B needs to load that value, but A currently resides in the store buffer and has not finished writing its value to memory, the hardware can make sure that B gets its value from the store buffer rather than memory. The value in memory is considered stale at that point (and, stale data may create errors or problems with a program).

An example solution to this problem may be to have each entry in the store buffer have a matching CAM. The store buffer entries have two components: the address to write to and the data to be written. Each of these entries may be kept in the same order that they are written to the store buffer, so that the oldest entry is the next one to be written to memory. An address comparator for each entry may compare its address against the address of any new load operation. When an address of a load matches one in the store buffer the value in the store buffer is forwarded to the load operation and the memory load is terminated. When more than one address in the store buffer matches a load address the youngest matching entry is used, i.e. the entry that was most recently put into the store buffer. The circuitry may be slightly more complicated because the store buffer entries may hold large chunks of data to be written (usually the processor word size, e.g. 32-bits) but if the architecture supports smaller size writes (e.g. bytes) then the address matchers may be augmented with valid bits that indicate which smaller chunks in each store buffer entry contain good data. Finally, depending on other factors in the micro architecture design, it may be possible to cancel entries in the store buffer before they are written if newer entries write to exactly the same locations. One problem that may arise is that, in some cases, relatively large store buffers may be used to support a large instruction window, which in some cases may slow down the processor clock cycle.

Therefore, according to an example embodiment, a multi-level store buffer may be provided, including: a small store buffer (e.g., level 1 store buffer, SB1) which may be a relatively small and fast buffer, e.g., located close to the execution units, and a larger store buffer (e.g., level 2 store buffer 2, SB2) that supports the large instruction window. This approach may be used for single cluster processors designed to run a single thread, as well as multi-threading and multiple cluster processors.

According to an example embodiment, each level 1 store buffer, SB1, may be a randomly allocated structure, i.e., it may not be allocated in a FIFO fashion as is done in a traditional store buffer. Since the traditional store buffer tracks age by the order in the buffer, and the randomly allocated SB1 may assign no meaning to the location of an entry within the store buffer, and the SB1 entries may store the age information explicitly. These values may be referred to as def (definition) and kill times. The instruction scheduler may be responsible for tracking a concept of scheduling time. When a store is written into the level 1 store buffer (SB1) the current time may be used for the def time and the kill time is undefined. If any other entry in the SB1 matches the same address of this new store, and that entry has an undefined kill time, its kill time is filled in. Again the circuitry gets a bit complicated because multiple entries can have the same address with different valid bytes written and the overlap with the new write (i.e. which bytes overlap) can be complicated. When a subsequent load comes in at time X, a match is done comparing its address for any SB1 entry with the same address that has no kill time. Finally, entries may be pulled out of the SB1 and moved (or copied) to SB2 in the order of their def time in order to keep stores in their proper logical order, according to an example embodiment.

According to an embodiment, the cluster store buffer, SB1 (level 1 store buffer), may be a randomly (LRU) allocated range CAM structure: every entry in this structure may be characterized by an interval for which it is valid, a [DefKill] interval, as well as an address. A load matches an SB1 entry if the addresses match, and if the load timestamp lies within the [DefKill] interval.

According to an example embodiment, the level 1 store buffer, SB1, may have a store buffer data width of, for example, 64 bits. (128 bits, e.g. 4×32 bits, or other data widths may be used.) Bitmasks may indicate (1) which bytes are written by the associated store, but also (2) which of the non-written bytes have valid data. Partial writes, that do not occupy the full 64 bit width, may have the missing bytes supplied. New store data exposed to the SB1 may be CAMed by the level 1 store buffer (SB1) entries, and may update the missing bytes of matching stores.

Figure 12:
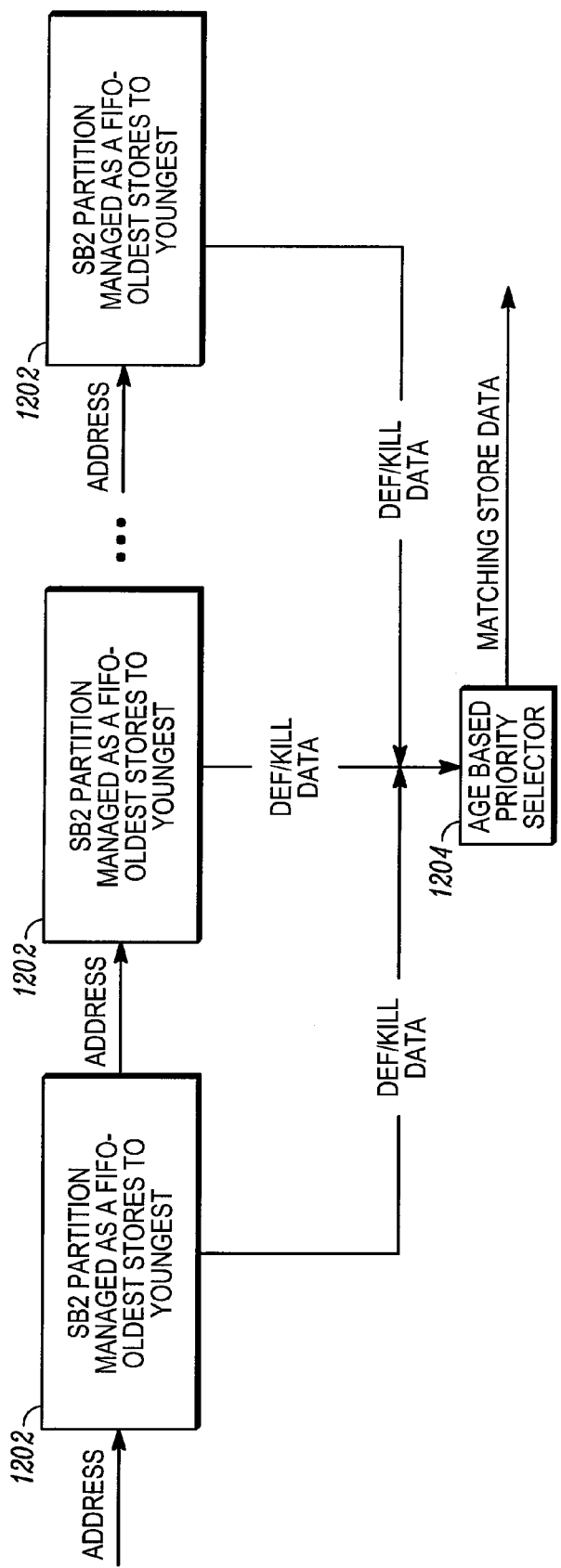
FIG. 12 illustrates a store buffer according to an example embodiment.

FIG. 12 illustrates a store buffer according to an example embodiment. Level 2 store buffer, SB2, may be managed as a FIFO so the comparators are relatively simple. Each entry may maintain the def/kill data but it is not matched against the address and execution time associated with the load instruction. Instead SB2 may be broken up into physical partitions 1202 or segments (e.g., segmented sequential storage) (FIG. 12), and each partition has a def time for the oldest entry it holds. Entries in an SB2 partition are then matched in FIFO order within the SB2 partition against the address of the load instruction. For the youngest matching entry in each partition, the partition returns the data stored in the entry along with the [DefKill] intervals. Selector logic 1204 then picks the oldest matching entry, according to an embodiment.

If a store buffer has multiple live partitions, all of the live partitions may be searched when a load occurs. However, this search may first begin by matching the partition that covers the logical scheduling time matching the time of the load and the next oldest partition, since it is already known that the younger partitions cannot provide matches. If a match is found in these two partitions then the data is provided to the load instruction. If these two partitions fail to match then all of the older partitions may next be searched and the youngest match returned to the load instruction. In many cases no partitions will match and the load will miss in the SB2 and be released to go to memory for the real data.

According to an example embodiment, less precise matching can be used in the case for some forms of speculative multi-threading. In essence, a thread may be executed assuming that certain data elements will not be changed by a concurrently executing thread. This assumption is then checked once the speculative thread is ready to either die or become non-speculative. According to an example embodiment, hardware may support the case where the data values available to the speculative thread have changed in a way that was not (or could not) be detected during the intermediate time (because the data may be checked at the end). Since in practice, at least for some systems, matches in the store buffer (SB) may be relatively rare, and SB1 is accessed before SB2, the speculative threads may cut short (or terminate) the SB2 search before determining that there is no match. The same hardware that makes speculative threads work by doing subsequent checking can be used to detect the use of stale data by the speculative thread.

Also, according to an example embodiment, entries may be kept with each partition or segment in the level 2 store buffer (SB2), and that these may be used to hold values that were satisfied by stores held in later partitions. For example, a load may miss in the SB1, miss in the SB2 partition that holds stores that were contemporaneous with the load and the next younger partition, and then hit in an older partition. These data values would then be cached in the contemporaneous SB2 partition.

If either multiple threads or multiple clusters are used, the SB2 partitions may be managed as a segmented sequential storage, with each partition becoming a segment (as part of a segmented sequential storage). For example, each partition would have a link to the next youngest and oldest partitions within the same thread.

Also, according to an embodiment, a process may be provided, such as in a microcode routine, to walk through the sequences of entries in a chain of SB2 partitions (or segments) and build new chains that are partitioned based on the store address. If the original single SB2 chain is broken into N chains of equal length, then the expected number of partitions to be searched for each new load address will be reduced by roughly 1/N. Since most load addresses miss in the store buffers this 1/N reduction may often be realized by most memory loads.

Also, when stores are moved from SB1 to SB2, they do not need to be removed from SB1. In this way, SB1 may operate as a filter to provide common matches and reduce the bandwidth on SB2. An SB1 entry should be marked as a copy once it is transferred to SB2 so that it is not copied there again in the future. The SB1 structure can be managed simply as an LRU cache with entries being long lived if they keep matching subsequent load addresses. If the execution cluster supports multi threading the SB1 entries may be separated by thread IDs, in order to distinguish between them.

Additional details and embodiments of a multilevel store buffer will now be described. The level 1 store buffer (SB1) may include one or more CAMs. The level 2 store buffer may, for example, include multiple partitions or segments of the classic store buffer, organized so as to minimize search time as the window grows larger.

According to an example embodiment, the shared intercluster store buffer, SB2 (level 2 store buffer), may be a segmented sequential data structure allocated per thread. Each segment may perform a store buffer forwarding calculation, such as find the youngest store older than a load. Each segment may return such a candidate store, with a [DefKill] interval. In an example embodiment, the SB2 does not actually store [Def,Kill] intervals, and does not CAM them globally: the interval returned may indicate "valid at end of segment" as the Kill time. By comparing all of the candidate stores returned by the segments, a single store to be forwarded from can be determined.

SB2's segments perform the appropriate updating of missing bytes as stores are placed into them. However, stores may not be exposed to all of a thread's SB2 segments, so there may not be a CAM updating between segments. SB1 entries may have data that is missing from the SB2 entries, and can be used to update the SB2 entries, i.e. the SB1 may be a write-behind.

Incoming loads may be satisfied from SB1 (level 1 store buffer) if hit. If missing SB1, they are sent to the cache (SB2), and start probing SB2. The load timestamp is known, so the segment that contains the load, and its immediate predecessor, are probed immediately. If the load is satisfied there, the data is immediately obtained. However, if the load is not satisfied there, conceivably it is necessary to probe all SB2 segments (partitions) between the load and the oldest instruction for that thread. This may be treated as a scheduling and prediction issue. All such segments may then be checked for the least speculative thread. However, for speculative SpMT threads it is acceptable to not probe certain segments, since verify re-execution will be performed and will eventually do all of the necessary probes near retirement (when fewer will be needed).

In an example embodiment, each segment or partition may contain approximately 32 stores. Several extra entries, e.g. 4, are allocated to hold "live-in", to allow loads to be satisfied directly from their containing segment even though the store is much older. These "live-in" entries may be managed according to a LRU (least recently used) caching algorithm.

All stores may be allocated in a single chain of segments. This allows address unknown comparisons as well as address matching. (It is assumed that Multi-Scalar has a store-to-load dependency predictor.) Segments do not need to be full: e.g. in eager execution, one thread continues using the original segment, and the other uses a new segment. If the other path is taken, the original SB2 segment will be empty after the fork point.

In an embodiment, since all stores may be allocated in a single chain of segments (partitions), stores from very different addresses may be stored in the same store buffer. The number of buffers that need to be probed for a load may be reduced by copying some of the stores out of the segment, into new segments that are restricted to a particular address range. Level 2 store buffer (SB2) segments may have a base address/mask pair, indicating what address range they are valid for. In one embodiment, store buffers may be partitioned by address range.

SB2 segments or partitions may be chained together, pointing to the parent in the main chain, as well as to summaries and address range partitions. Similarly, for SpMT (speculative multi-threading) and eager threads, two SB2 chains will point to the same ancestor. Reclaiming an SB2 segment may involve updating such links. In one embodiment, there may not be garbage collection, and therefore, a segment can be recovered whenever any thread using it is ready to retire, since it need not be delayed for correctness.

In an example embodiment, the store buffer microarchitecture may employ timestamps, particularly in the SB1 [DefKill] interval CAMs. In the SB2, sequential allocation and cross-linking means that the timestamps are implicit; or, rather, the SB1 timestamps can be reconstructed whenever needed. If it is necessary to renumber the SB1 timestamps, as sometimes happens with branch mispredictions in SpMT, the entire SB1 can be discarded (except for stores waiting to be sent to the SB2), since the SB2 may be considered to be authoritative.

Implicit SB2 ordering and explicit SB1 timestamps may allow multithreaded SB1 timestamps to be simplified in some cases. For example, skip-ahead threads need not have their timestamp bumped up: from the point of view of the SB1, they can have a completely separate thread ID, or employ the bit masks also used for eager execution.

Eager threads may employ bit masks in the well-understood manner. This allows SB1 entries from before the fork to be shared by both children threads. However, when these bits run out, it is not necessary to stop forking: the forked thread can be allocated a new SB1 thread ID, and simply lose the opportunity for SB1 entry sharing.

According to an embodiment, stores eventually end up in the shared level 2 storage buffer, SB2. Because this SB2 is closer to the L2 data cache than the L1, store commit is done into the L2, invalidating or updating the L1 as necessary, which may be considered an Inverse write-through.

In an example embodiment, a store-to-load dependency predictor may predict whether a load should receive data from a store. The relative store buffer offsets are interpreted in terms of the segmented sequential SB2; they do not typically apply to the range CAM SB1. It is straightforward to determine, when the load and store addresses become known, whether a load and store indeed match. It is necessary, however, to verify that no intervening younger store also matches. The store-to-load forwarding prediction may constrain and limit the amount of store buffer forwarding necessary, but not eliminate it. It is still necessary to verify that the prediction was correct, in one embodiment. As discussed above, such verification may involve probing several segments of the SB2.

If the store-to-load forwarding predictor is very good, the verification may be delayed. The closer the load is to retirement, the fewer SB2 segments need to be probed. Such store-to-load forwarding prediction reduces SB1 complexity. The [Def, Kill] CAM may not need to be used as often, if at all. Instead, the SB1 could CAM on the SB2 index, so that the relative prediction can access it.

H. Examples Relating to Multi-Threading

According to an example embodiment, the multilevel instruction pipeline of processor 100 (e.g., FIG. 1) may support multithreading, such as implicit multithreading, explicit multithreading, and other types of multithreading. In one embodiment, multiple threads may be run on the same out-of-order execution core. However, this arrangement, in some cases, may provide contention and thrashing of the pipeline. Therefore, to improve performance, the processor 100 may provide a multilevel pipeline in which one or more structures may be replicated in multiple execution clusters. As noted above, there may be one thread per cluster, although this is not required. There may be multiple threads per cluster, and a thread may spawn (or fork to create) a new thread, where the new thread may run on the same cluster or a different cluster as the parent thread. Threads may be statically bound to clusters, or they may be dynamically created and assigned to a different cluster.

In an example embodiment, the processor 100 may virtualize threads, allowing a large number of threads, and store their state in data structures maintained in user memory. The virtual user threads may be context switched from this data structure by hardware and microcode, and may be time multiplexed onto a smaller number of hardware thread contexts.

According to an example embodiment, the multicluster multithreaded microarchitecture may provide explicit multithreading, where threads may be created at boot time, and may each run on a single cluster, although this is not required, and is merely an example. Explicit multithreading may, for example, refer to a processor where a programmer may specify parallelism explicitly. Static explicit multithreading (SEMT) may refer to where logical CPUs or logical processors may be visible to the operating system (OS) at boot time, and may be nearly identical to independent CPUs in a multiprocessor system, and where the OS manages each as an independent CPU, according to an example embodiment. Dynamic explicit multithreading (DEMT) may allow users to create threads through a Fork instruction. The OS may be aware of such threads, although not necessarily.

Forking (e.g., a thread spawning a new thread) may involve, for example, obtaining a new instruction pointer (IP), and obtaining a new register context (for the new thread). One mechanism that can provide this is to read the IP and other register values from a memory data structure. In one embodiment, a clone of the complete architectural state is provided for the new thread, with a difference being that a condition code may indicate whether a thread is a parent or child.

In an example embodiment, since the parent and child threads may reside in the same memory space, parent stores committed before the fork should be visible to the child. However, in some cases it may not be appropriate to forward stores subsequent to the fork point between parent and child threads: this could produce an architectural difference in behavior from emulating this architecture on separate CPUs in a processor consistent memory-ordering model.

In another example embodiment, the parent and child threads may run on different clusters. The child thread could be created on a separate cluster by sending the desired IP over; most registers could be hardwired, or some registers (or none) transferred between clusters along with the IP; the store buffer could be drained so that it is visible to both parent and child clusters before the child begins execution. The inter-cluster transfer may occur on data paths similar to those used for inter-cluster memory traffic.

Store buffer consistency between clusters can remove a substantial and often the largest fork delay. To sustain such consistency, all of the store buffer contents could be eagerly pushed from the parent cluster; all could be pulled from the child cluster; or, only what is needed could be lazily pulled on demand from the child cluster. As the amount of speculation grows, lazy pulling on demand gains advantage.

Figure 13:
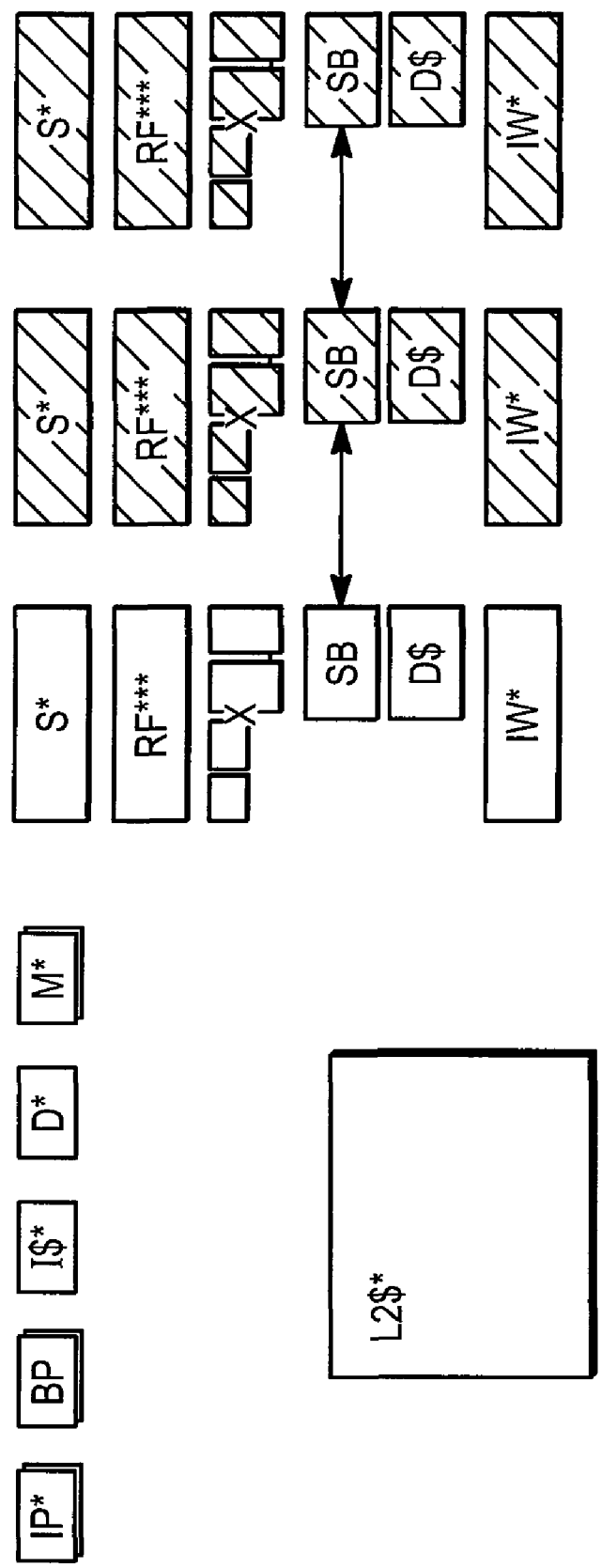
FIG. 13 is a block diagram illustrating a data path between store buffers of different clusters.

A data path between store buffers of different clusters is shown in FIG. 13. Once there is a data-path between clusters for store buffer consistency (possibly shared with inter-cluster cache consistency), the fork instruction microcode may transfer register values via explicit pseudo-stores. This amounts to pushing the register values into a store buffer mechanism that may involve pulling on-demand.

According to an example embodiment, more than one explicit thread can run on a cluster. If the clusters are themselves multithreaded, then dynamic inter-cluster thread migration may be used for load balancing, for example. And dynamic inter-cluster thread migration may use an efficient inter-cluster data value transfer mechanism for both store buffer and register values. Multiple threads may run over each execution cluster. For example:

A relatively small number of clusters may be used: 2, 3, or 4. DEMT and IMT workloads probably need more threads than that, approaching 16 threads.

Running more than one thread on the same cluster is often desirable for SoEMT, Switch-on-Event Multithreading. However, if two threads start out sharing the same cluster using SoEMT, and then stop taking cache misses, inter-cluster migration is desirable for load balancing.

Frequent communication between parent and child may occur at the time of fork, while little or no communication, except through consistent (non-store-buffer) memory, may occur thereafter.

This may involve running the child thread on the same cluster as the parent thread for a while, and only migrating later. This applies well to IMT (implicit multithreading)/SpMT (speculative multithreading), since latency for thread migration may be tolerated for an aggressive speculative thread.

In another example embodiment, a datascalar approach could be used. In such an approach, the child thread can run on both the parent's old cluster and a new cluster. Datascalar forwarding can then push values from old to new clusters. After a while, the child thread on the old parent's old cluster terminates and the remaining child thread runs only on the new cluster. The child thread then relies on lazy pull on demand to obtain values that were not pushed by the datascalar thread.

Instruction batching may be used in an alternative embodiment, e.g., as a way of possibly benefiting from multiple clusters without SpMT: run a group of instructions (e.g., 1000 instructions) on one cluster, and then run the next 1000 instructions on a second cluster. Changing the focus in this manner amounts to thread migration, and may involve inter-cluster forwarding. If the batches cycle, it closely resembles SMT clustering.

In an example embodiment, both IMT and DEMT may use clone forking, with both parent and child running on the same cluster, migrating later.

To the explicit multithreading microarchitecture described above, a number of features may (optionally) be added to support implicit, speculative, skipahead, and eager multithreading:

Thread predictor (TP), which is used to predict which thread should be activated for execution next.

A mechanism to gain benefit from speculative execution: This may involve taking advantage of speculation to prefetch data into the cache. A trace-log (TL) mechanism may be used in an example embodiment. The TL records which data values read by the thread were previously produced by another thread (i.e. live-in values) and which values written by the thread may be read by subsequent threads (i.e. live-out values). The TL may employ parallel verification in order to facilitate re-execution.

Store buffer tag bits may be used to support eager forwarding.

Figure 14:
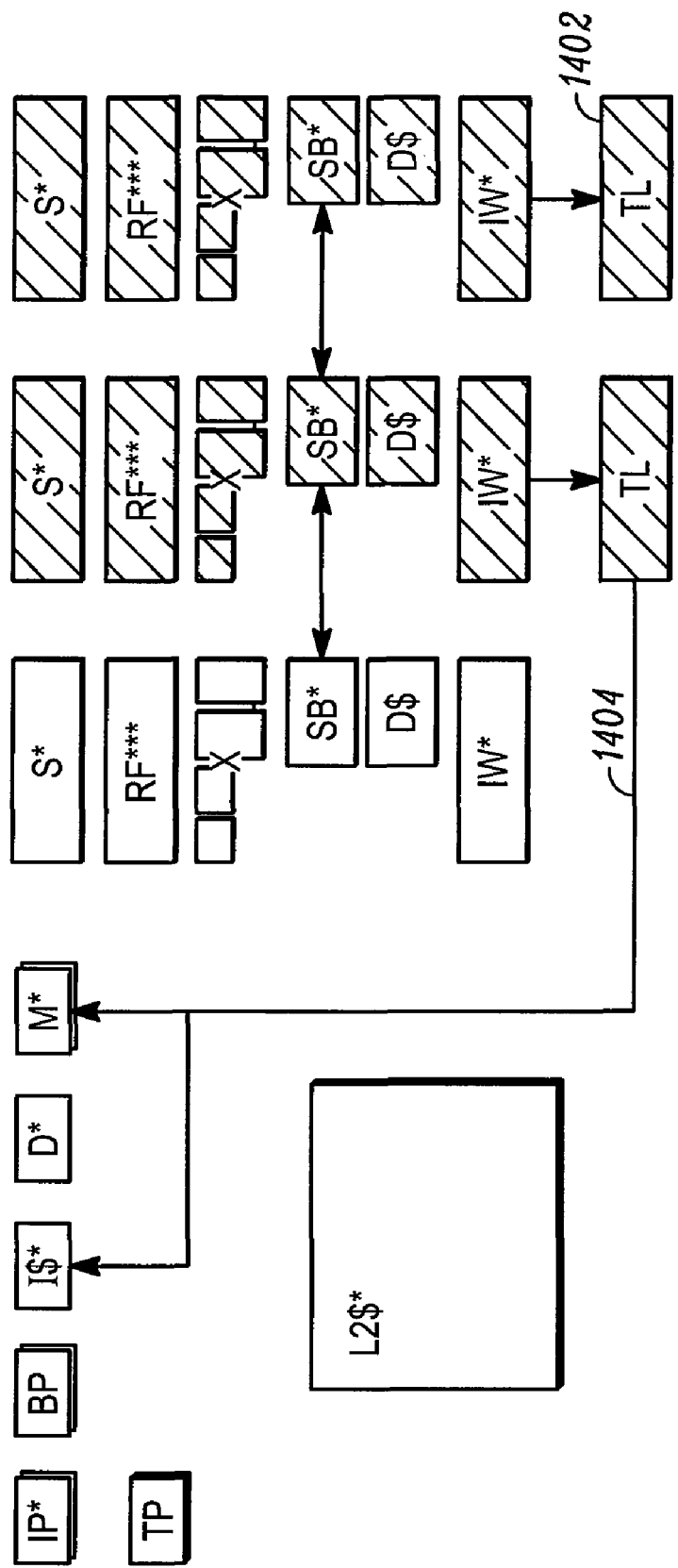
FIG. 14 is a block diagram of a processor that illustrates an example use of trace-logs.

FIG. 14 illustrates trace-logs 1402 coupled via lines 1404 to mapper (M) and the instruction cache.

The trace log per cluster is not shown, to emphasize that non-speculative threads may not commit results to a trace log (unless they are using it as a non-speculative block instruction reuse buffer). In another embodiment, the trace log may be a large shared segmented sequential data structure, with a few ports.

Trace log 1402 may verify re-execution fetched instructions out of the trace log and may send them directly to the mapper/renamer (M), with minimal decoding.

As noted above, there are a number of techniques that may be used to support multithreading. Much of what has been described may relate to explicit multithreading.

A number of techniques may be used to support implicit multithreading, including eager execution and speculative/skipahead multithreading (SpMT/SkMT).

Eager execution requires the existence of a fork mechanism: forking the map, and employing tag bits as is well known. When the eager branch resolves, simply discard the wrong path, arranging to recover its resources.

Eager threads need not be forked immediately. As for SpMT threads, a potential fork place can be recorded simply as an offset into the map delta list. If, later, it is decided to fork a thread, the map can be reconstructed at the fork place, and then cloned (or, actually, cloned, and then moved along the delta list to the fork place). This allows deferred eager forking. Eager may be simpler than SpMT because there is no need to forward between threads, only from pre-fork to post-fork paths.

The skip-ahead form of speculative multithreading may be used as well, which is itself a form of implicit multithreading, to improve single thread performance.

IMT/SpMT/SkMT may be more complex than eager threading, since they may involve communicating from a least speculative to more speculative thread. In an example embodiment, this may be achieved via a trace-log: instruction results may be recorded in the trace-log. When a less speculative thread runs into a speculative thread, it joins by fetching the operations and results stored in the trace-log, verifying that they are the correct instructions, and verifying that they provide the same result. Parallel verification, may typically be faster than original execution so long as it is correct, in an example embodiment.

If the data values are incorrect but the instructions are correctly fetched, replay suffices, if sparse enough. If too dense, or if the instruction streams have diverged, stop re-executing out of the trace-log; but be ready to join in later, in an embodiment.

One or more (or even all) instruction results may be recorded in the trace-log. In another embodiment only branch directions may be recorded.

In another embodiment, a multi-level trace-log may be provided: e.g., that records (e.g., all) instruction results, but also hierarchically batch, recording and verifying live-ins to a block. It may be used to verify re-execute at a coarse granularity.

Trace-log start points may be recorded in a table that is hash-indexed via the SpMT history. Potential join instructions, such as "returns", pop the SpMT history, and look up trace-log-start points. If these are found, trace-log verify re-execution can begin.

According to an example embodiment, a fork predictor may be used. Fork sites may be indexed by an IP hash, possibly incorporating branch predictor history, and possibly presenting speculation depth. According to an example embodiment, the fork predictor may provide the Von Neuman identity (VNID) of the last dependency: For example, once past that point (VNID), we can fork the thread. The VNID may record, for example, if the last dependency is itself speculative when the mis-speculation is recognized.

Lacking this last dependency information, the fork predictor may for example record how far it was able to go—a reduced form of the number of instructions successfully trace-log verify re-executed. If too low, forking may be prevented.

The fork predictor may record some a priori information, such as the number of instructions between CALL and return, the number of branch prediction errors, the number of cache misses, and the number of pipeline stalls I. Examples Relating to Cache and Memory Ordinary instructions may be cached, e.g., in an instruction cache. Sometimes these instructions are built into blocks called traces and these can be cached, typically in a trace cache. A trace cache in a processor may include, for example, an instruction cache that stores dynamic instruction sequences, e.g., after they have been fetched and executed in order to follow the instructions at subsequent times without needing to return to the regular instruction cache or the memory for the same instruction sequence. An advantage of the trace cache is it may reduce the required fetch bandwidth on the processing pipeline.

In addition, some instructions may be very complex and may decode or translate into, e.g., five or more uops, and therefore may not be decoded by the standard instruction decoder. Instead, these complex instructions may be sent to a micro instruction sequencer (MIS) for decoding or translation. The MIS may include a microcode ROM that contains a series of micro-ops (or uops) associated with each complex architectural instruction. A series of one or more uops (micro-ops) are produced by the decoder when a complex architectural instruction is decoded or translated—this series may be placed into a microcode cache. According to an example embodiment, the microcode for the MIS (e.g., which may include the series of uops for one or more complex instructions) may be cached with either the trace cache entries (e.g., in a trace cache) or with ordinary instructions or uops (e.g., cached in the ordinary instruction cache). By allowing the MIS microcode to be dynamically cached in either the instruction cache or the trace cache, this may provide more efficient usage of the overall cache memory, e.g., dynamically allocating the cache storage to the type of instruction that can best benefit at any particular point in time.

Therefore, a multilevel microcode (e.g., for MIS) may be provided that may include a MIS microcode ROM (e.g., level 2 microcode store) to store the series of uops associated with each complex architectural instruction, and a level 1 cache that may cache the MIS microcode for at least some of the complex instructions. The level 1 (L1) cache for the MIS microcode may be a separate microcode cache or may be either the trace cache and/or the L1 instruction cache. As noted, in an example embodiment, the MIS microcode for some complex instructions may be dynamically stored or allocated to either the trace cache or the instruction cache, depending on availability of space in these caches, or other criteria.

According to an example embodiment, a branch predictor may be provided for the instruction cache (I$), for the trace cache (T$) and the microcode cache (UC). The BP2 branch predictor can be shared between the I$, T$, and UC (microcode) branch predictors. It may be advantageous to have private BP1 predictors tightly bound to (or associated with each of) the I$, T$, and UC. Also, multiple BPQs (branch predictor queues) may be used, such as a BPQ between: BP1→I$ (between the level 1 branch predictor and instruction cache), BP1→T$ (between BP1 and trace cache), BP1→UC (between level 1 branch predictor and the microcode cache). Private BP1s may allow specialization.

In another embodiment, a level 2 branch predictor (BP2) or a level 1 branch predictor (BP1) may be shared between the instruction cache (I$) and the trace cache (T$), since instruction fetch switches between them, for example. Sharing UC BP with I$ and T$ may be different, because UC fetch typically nests within normal instruction fetch. This may be handled by introducing a new thread for microcode embedded in a longer instruction flow. The UC (microcode) BP (branch prediction) history may be initialized with the global fetch BP history at the start of the microcode flow.

According to an example embodiment, the shared inter-cluster memory data-structures—the level 2 (L2) memory cache (M$2 or D$2, 156 in FIG. 1), the L2 store buffer (SB2, 154 in FIG. 1), and the L2 register file (RF2/PRF/IW, 152 in FIG. 1)—may use an inter-cluster directory. The shared inter-cluster structures may maintain a directory of clusters containing a value at each entry, including: a directory value at each cache line for level 2 cache (M$2 or D$2), a director value at each store buffer entry for the level 2 store buffer (SB2), and a directory value at each physical register for RF2/PRF. The directory value at each entry may indicate, for example: whether the L2 copy is valid, which cluster owns the value (i.e. which cluster should be interrogated to obtain a value), which clusters have requested a value, i.e. to which clusters a reply should be sent back when the value is passed to the L2, and whether an interrogation request has already been sent for write-back or write behind structures.

A conventional directory based MES1 based protocol may be used for M$2/D$2. For registers and store buffer entries an update protocol may be used as well, such as a protocol that may be the same or similar to the protocol used for M$2/D$2. Memory cache probes and invalidations may be steered (e.g., to the correct structure or cluster) using this directory for M$2/D$2.

According to an embodiment, the cluster caches and other structures (e.g. D$1, RF1, OC, SB1, RF1, S1, and X) may each be a cache or structure used for all clusters that is divided into partitions for each cluster or thread. For example, this may involve: a single data cache (D$1), with three partitions in the cache, one cache partition for each cluster; one level 1 register file (RF1), with three partitions in RF1, one partition for each cluster; one operand capture array (OC), with three partitions in this array, one OC partition for each cluster; one level 1 register file, that has three partitions, one partition for each cluster. IW1 could involve one window (IW1), partitioned for each cluster. One level 1 store buffer (SB1), partitioned into three SB1 partitions, and one partition for each cluster. Such partitioning of a single cache array might have some advantages—e.g. unused partitions could be reclaimed when fewer threads are running, or when the cluster is not being used (e.g., only 1 thread running over 1 cluster).

Figure 15:
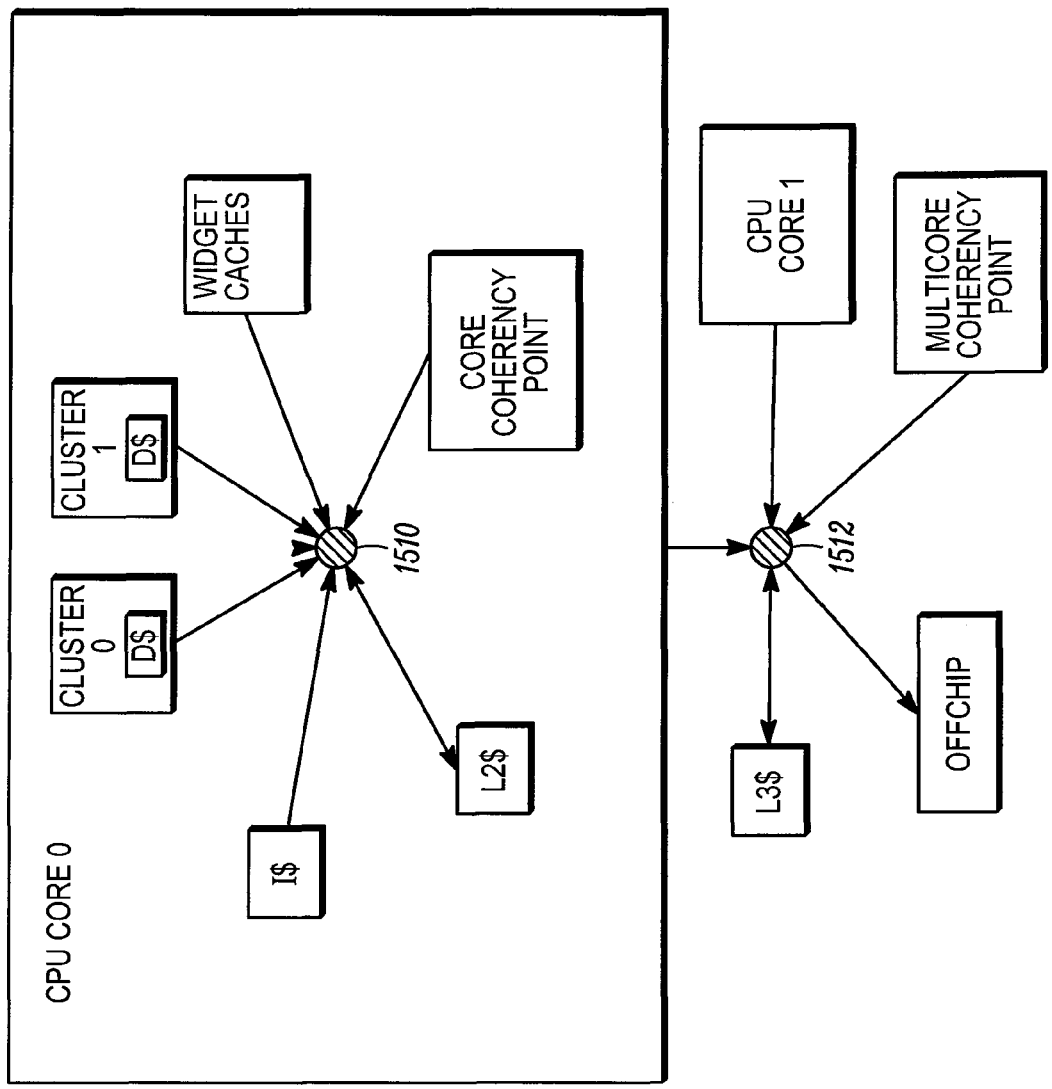
FIG. 15 is a block diagram of a multi-core processor according to an example embodiment.

However, according to another embodiment, the cluster caches and/or other per-cluster structures (e.g., D$1, RF1, OC, SB1, RF1, S1, X) may actually be separate structures (e.g., not simply one cache or structure that is partitioned). For example, three separate OC arrays may be provided, one OC array for each cluster; three separate D$1 arrays provided, one D$1 for each cluster; three separate level 1 store buffers, one level 1 store buffer (SB1) for each cluster; three separate level 1 register files (RF1), with one RF1 per cluster; three separate level 1 schedulers (not merely one scheduler partitioned into three partitions for each scheduler), etc. Using separate caches or structures may have several advantages. For example, looking at the use of separate caches, there are several advantages (similar advantages may apply to the other per-cluster structures). First, separate arrays or caches may typically be smaller, and hence faster. Second, the clusters may be as independent as possible, layout wise, containing scheduler, execution units, and cache (and possibly other structures for each cluster). If the cluster caches were just partitions of a single array, it may be more difficult to vary the number of clusters J. Additional Examples Relating to Multi-core Processors According to an example embodiment, a processor may be provided with multiple processor cores. FIG. 15 is a block diagram of a multi-core processor 1500 according to an example embodiment. The example processor 1500 may include processor core 0 and core 1, although any number of cores may be provided. The multi-core processor of FIG. 15 may also include a multi-level cache hierarchy, such as (as an example):

L1: there may typically be several first level caches, such as the instruction cache (I$), the data caches (D$) (one D$ per cluster), and possibly other "widget" caches, such as a cache dedicated to floating point or vector data.

L2: According to an example embodiment, the processor 1500 may include a single L2 core coherency point 1510 (shown for core 0) from a CPU core to outside the CPU. It is natural to make this a coherency point. It is also natural to attach an L2 cache at this point, such as an L2 per-CPU core. At this point 1510, there may be connections with the instruction cache (I$), data caches (D$), L2$, etc.

L3: caches shared between clusters. There may also be a multicore coherency point 1512 where all CPU cores are coupled together and through they may communicate with off-chip devices or structures, such as a level 3 cache (L3$).

In addition, each of the CPU core's I$ and D$ may each have their own paths to the outside world (to/from off-chip structures or devices). Also, arrangements may be used where several cores may share a single I$ path, while having separate D$. However, the "single coherency point per CPU core" model may have advantages, in that it may scale better from a simple CPU core that has no cache, through a CPU core that has only a unified cache, through processor cores that might have L1 I$ and D$, through advanced micro-architectures with more specialized forms of cache. It may hide the cache structure of the CPU core from the outside world, permitting heterogeneous multi-core systems, according to an example embodiment.

Note that this arrangement always allows a given cache level to be set to 0. For example, if there is no per-CPU core unified cache, effectively there is a single L2 shared amongst all cores. Or, if there is no cache shared amongst all cores, effectively there are two or more CPU cores each with completely separate caches. This allows several different configuration options, which is advantageous for a company trying to get the most mileage out of a given microarchitecture by selling it in multiple configurations. However, this is merely another example embodiment, and the disclosure is not limited thereto.

According to an example embodiment, each OS (operating system)—managed process may have a data structure, in that process's user virtual memory, that describes currently ready explicit threads. This may be referred to as the process run queue. It may be called the "process run queue", because it may describe the threads ready for a process. The OS may be aware of processes, running one OS process on each logical processor (logical processor that the OS is aware of). A number of different instructions may be employed, for example, although there are many instructions that may be used.

According to an example embodiment, the processor 1500 may include multiple cores (multi-core processor), since it may include multiple copies of the same CPU core e.g., on the same die. In an example embodiment, the multi-core processor (e.g., processor 1500) may run multiple threads per CPU core.

A multitclustered CPU core may be divided into clusters that communicate more tightly within than between clusters. In particular, clusters that contain 1 copy of each of the scheduler, execution units, data cache and store buffers may be particularly well suited to running one thread per cluster, although the disclosure is not limited thereto. According to an example embodiment, such as shown in FIG. 15, the processor may be a multi-core, multithreaded, multicluster (e.g., multiple clusters per core) processor.

According to an example embodiment, if there are N CPU cores on a chip, and M threads may be run for each core, then M*N threads, or logical processors, may run per chip.

There may be some workloads that may benefit from a larger number of logical processors (cores). E.g. M=4 threads/core, N=8 cores/chip==>M*N=32 threads per chip.

Power may be a second reason. 2 independent threads running on 2 fully independent cores may have better performance than the same 2 independent threads running on the same core, at least in some cases. However, although the peak performance may be lower for the multithreaded/multicluster CPU core, the power/performance ratio may be better for the multiclustered solution than for the multicore solution. The multicore chip has 2× the power consumption, both static and dynamic. The multicluster multithreaded core may (according to an example embodiment) replicate the out-of-order core, roughly ⅛ the core on some chips. Thus, 2 clusters cost 12.5% area, and hence 12.5% leakage; round up to 15% to account for extra routing. Leakage for the rest of the core remains the same. Dynamic power may roughly double; but nevertheless, the power performance ratio is likely to be improved.

Power management considerations may amplify this: it is probably easier to completely power off a second core than a cluster within a core. This may motivate both multicore and multithread: for some workloads that use 2 threads, neither thread fully exercising a CPU core, it may be better to run both threads on the same core, powering off the second core, in an example embodiment.

An example advantage of a multithreaded, multicluster, and multicore processor, according to an example embodiment, involves microarchitecture techniques that fork new threads: speculative Skipahead Multithreading, eager Multithreading, and/or explicit user level instruction set extensions.

For some period of time, the pre-fork code should forward to the post-fork. This will be easiest if on the same CPU core, indeed, if on the same cluster within a CPU core, sharing bypass networks and store buffers. Eventually, long lived independent threads should migrate to different clusters, and to different CPU cores, according to an example embodiment.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A hierarchical store buffer included in a hierarchical microprocessor including a plurality of execution clusters, the hierarchical store buffer comprising:
   a second-level store buffer that includes a plurality of entries, the second-level store buffer configured to:
   receive data values to be written to a memory subsystem from the plurality of execution clusters;
   store the received data values in at least one of the plurality of entries prior to writing the data values to the memory subsystem; and
   store a definition time reflecting a time at which a respective entry of the plurality of entries is written into and a kill time reflecting another time at which another entry of the plurality of entries that has a matching same address as the respective entry is subsequently written into,
   wherein the second-level store buffer includes a segmented sequential data structure, the segmented sequential data structure segmented into a plurality of partitions with one or more partitions restricted to a particular address range, a respective partition of the plurality of partitions associated with a respective definition time of a particular entry of the plurality of entries, with the particular entry comprising an oldest entry of the respective partition of the plurality of partitions; and
   a plurality of first-level store buffers each operatively coupled with the second-level store buffer, each first-level store buffer being included in a respective execution cluster, the first-level store buffers each configured to:
   receive data values to be written to the memory subsystem from one or more execution units of the respective execution cluster; and
   store the received data values in a respective first-level store buffer prior to copying the data values to the second-level store buffer,
   wherein the plurality of first-level store buffers and the second-level store buffer are collectively configured to:
   copy the stored data values from the first-level store buffers to the second-level store buffer;
   compare memory subsystem addresses of store buffer entries with a memory subsystem address of a memory load instruction;
   provide a data value from a youngest store buffer entry subsequent to scheduling of the memory load instruction;
   determine a youngest entry, for each of multiple partitions of the plurality of partitions, that matches a memory subsystem address of another memory load instruction; and
   exclude one or more partitions of the plurality of partitions from a determination of the youngest entry based at least partially on a load timestamp of the other memory load instruction and respective definition times associated with respective partitions of the plurality of partitions.

2. The hierarchical store buffer of claim 1, wherein first-level store buffer entries are retained in the respective first-level store buffer after the stored data values are copied to the second-level store buffer.

3. The hierarchical store buffer of claim 1, wherein store buffer entries of the first-level store buffers and the second-level store buffer each include:
   a data value to be written to the memory subsystem; and
   an address in the memory subsystem to which the data value is to be written.

4. The hierarchical store buffer of claim 3, wherein the store buffer entries of the first-level store buffers each include a validity interval for the data value, the validity interval including a definition time and a kill time.

5. The hierarchical store buffer of claim 1, wherein each of the first-level store buffers includes a content-addressable memory structure.

6. A method comprising:
in a second-level store buffer having a plurality of entries included in a hierarchical microprocessor, the second-level store buffer including a segmented sequential data structure that is segmented into a plurality of partitions with one or more partitions restricted to a particular address range, a respective partition of the plurality of partitions associated with a respective definition time of a particular entry of the plurality of entries, with the particularr comprising an oldest entry of the respective partition of the plurality of partitions:
  receiving data values to be written to a memory subsystem from a plurality of execution clusters included in the hierarchical microprocessor;
  storing the received data values prior to writing the data values to the memory subsystem;
  storing a definition time reflecting a time at which a respective entry of the plurality of entries is written into; and
  storing a kill time reflecting another time at which another entry of the plurality of entries that has a matching same address as the respective entry is subsequently written into;
in a plurality of first-level store buffers each operatively coupled with the second-level store buffer, each first-level store buffer being included in a respective execution cluster of the plurality of execution clusters:
  receiving data values to be written to the memory subsystem from one or more execution units of the respective execution clusters; and
  storing the received data values in a respective first-level store buffer prior to copying the data values to the second-level store buffer;
copying the stored data values from the first-level store buffers to the second-level store buffer;
comparing memory subsystem addresses of store buffer entries with a memory subsystem address of a memory load instruction;
providing a data value from a youngest store buffer entry subsequent to scheduling of the memory load instruction;
determining a youngest entry, for each of multiple partitions of the plurality of partitions, that matches a memory subsystem address of another memory load instruction; and
excluding one or more partitions of the plurality of partitions from a determination of the youngest entry based at least partially on a load timestamp of the other memory load instruction and respective definition times associated with respective partitions of the plurality of partitions.

7. The method of claim 6, further comprising:
retaining first-level store buffer entries in the respective first-level store buffer after the stored data values are copied to the second-level store buffer.

8. The method of claim 6, wherein storing store buffer entries in the first-level store buffer and the second-level store buffer includes:
  storing a data value to be written to the memory subsystem; and
  storing an address of the memory subsystem to which the data value is to be written.

9. The method of claim 8, wherein storing store buffer entries in the first-level store buffer further includes:
storing a validity interval for the data value, the validity interval including a definition time and a kill time.

10. The method of claim 6, further comprising:
storing and accessing store buffer entries in one or more partitions of the plurality of partitions in a segmented sequential fashion.

11. The method of claim 6, further comprising:
storing and accessing store buffer entries in the first-level store buffer based on respective content of the store buffer entries.

12. A microprocessor comprising:
a plurality of execution clusters;
a plurality of second-level architectural elements for processing instructions in the microprocessor, the plurality of second-level architectural elements being configured to act as shared resources for the plurality of execution clusters, wherein the plurality of second-level architectural elements includes a second-level store buffer that has a plurality of entries and that is configured to:
  receive data values to be written to a memory subsystem from the plurality of execution clusters;
  store the received data values prior to writing the data values to the memory subsystem; and
  store a definition time reflecting a time at which a respective entry of the plurality of entries is written into and a kill time reflecting another time at which another entry of the plurality of entries that has a matching same address as the respective entry is subsequently written into,
  wherein the second-level store buffer includes a segmented sequential data structure, the segmented sequential data structure segmented into a plurality of partitions with one or more partitions restricted to a particular address range, a respective partition of the plurality of partitions associated with a respective definition time of a particular entry of the plurality of entries, with the particular entry comprising an oldest entry of the respective partition of the plurality of partitions; and
a plurality of first-level store buffers each operatively coupled with the second-level store buffer, each first-level store buffer being included in a respective execution cluster, the first-level store buffers each being configured to:
  receive data values to be written to the memory subsystem from one or more execution units of the respective execution cluster; and
  store the received data values in a respective first-level store buffer prior to copying the data values to the second-level store buffer,
wherein the plurality of first-level store buffers and the second-level store buffer are collectively configured to:
  copy the stored data values from the first-level store buffers to the second-level store buffer;
  compare memory subsystem addresses of store buffer entries with a memory subsystem address of a memory load instruction;
  provide a data value from a youngest store buffer entry subsequent to scheduling of the memory load instruction;
  determine a youngest entry, for each of multiple partitions of the plurality of partitions, that matches a memory subsystem address of another memory load instruction; and
  exclude one or more partitions of the plurality of partitions from a determination of the youngest entry based at least partially on a load timestamp of the other memory load instruction and respective definition times associated with respective partitions of the plurality of partitions.

13. The microprocessor of claim 12, wherein first-level store buffer entries are retained in the respective first-level store buffer after the stored data values are copied to the second-level store buffer.

14. The microprocessor of claim 12, wherein store buffer entries of the first-level store buffer and the second-level store buffer each include:
a data value to be written to the memory subsystem; and
an address in the memory subsystem to which the data value is to be written.

15. The microprocessor of claim 14, wherein the store buffer entries of the first-level store buffers each include a validity interval for the data value, the validity interval including a definition time and a kill time.

16. The microprocessor of claim 12, wherein each of the first-level store buffers includes a content-addressable memory structure.

17. A hierarchical microprocessor including a plurality of execution clusters, the hierarchical microprocessor including:
a second-level store buffer that includes a plurality of entries and that is configured to:
receive data values to be written to a memory subsystem from the plurality of execution clusters;
store the received data values prior to writing the data values to the memory subsystem; and
store a definition time reflecting a time at which a respective entry of the plurality of entries is written into and a kill time reflecting another time at which another entry of the plurality of entries that has a matching same address as the respective entry is subsequently written into,
wherein the second-level store buffer includes a segmented sequential data structure that is segmented into a plurality of partitions with one or more partitions restricted to a particular address range, a respective partition of the plurality of partitions associated with a respective definition time of a particular entry of the plurality of entries, with the particular entry comprising an oldest entry of the respective partition of the plurality of partitions; and
a plurality of first-level store buffers each operatively coupled with the second-level store buffer, each first-level store buffer being included in a respective execution cluster, the first-level store buffers each being configured to:
receive data values to be written to the memory subsystem from one or more execution units of the respective execution cluster; and
store the received data values prior to copying the data values to the second-level store buffer,
wherein the hierarchical microprocessor is configured to:
copy the stored data values from the plurality of first-level store buffers to the second-level store buffer;
compare memory subsystem addresses of store buffer entries with a memory subsystem address of a memory load instruction;
provide a data value from a youngest store buffer entry subsequent to scheduling of the memory load instruction;
determine a youngest entry, for each of multiple partitions of the plurality of partitions, that matches a memory subsystem address of another memory load instruction; and
exclude one or more partitions of the plurality of partitions from a determination of the youngest entry based at least partially on a load timestamp of the other memory load instruction and respective definition times associated with respective partitions of the plurality of partitions.

18. A method comprising:
in a second-level store buffer having a plurality of entries included in a hierarchical microprocessor, the second-level store buffer including a segmented sequential data structure that is segmented into a plurality of partitions with one or more partitions restricted to a particular address range:
receiving data values to be written to a memory subsystem from a plurality of execution clusters included in the hierarchical microprocessor;
storing the received data values prior to writing the data values to the memory subsystem;
storing a definition time reflecting a time at which a respective entry of the plurality of entries is written into; and
storing a kill time reflecting another time at which another entry of the plurality of entries that has a matching same address as the respective entry is subsequently written into,
wherein a respective partition of the plurality of partitions is associated with a respective definition time of a particular entry of the plurality of entries, with the particular entry comprising an oldest entry of the respective partition of the plurality of partitions;
in a plurality of first-level store buffers each operatively coupled with the second-level store buffer, each first-level store buffer being included in a respective execution cluster of the plurality of execution clusters:
receiving data values to be written to the memory subsystem from one or more execution units of the respective execution clusters; and
storing the received data values prior to copying the data values to the second-level store buffer;
copying the stored data values from the first-level store buffers to the second-level store buffer;
retaining first-level store buffer entries in a given first-level store buffer after the stored data values are copied to the second-level store buffer;
comparing memory subsystem addresses of store buffer entries with a memory subsystem address of a memory load instruction;
providing a data value from a youngest store buffer entry subsequent to scheduling of the memory load instruction;
determining a youngest entry, for each of multiple partitions of the plurality of partitions, that matches a memory subsystem address of another memory load instruction; and
excluding one or more partitions of the plurality of partitions from a determination of the youngest entry based at least partially on a load timestamp of the other memory load instruction and respective definition times associated with respective partitions of the plurality of partitions.

19. The method of claim 18, further comprising:
storing and accessing store buffer entries in one or more partitions of the plurality of partitions in a segmented sequential fashion; and
storing and accessing store buffer entries in the first-level store buffer based on content of the store buffer entries.

20. The hierarchical microprocessor of claim 17, further including:
- a second-level register file including a plurality of mappable registers, the second-level register file configured to:
  - allocate the plurality of mappable registers so as to store execution results of instructions executed by the plurality of execution clusters; and
  - provide secondary register storage for the plurality of execution clusters; and
- a plurality of first-level register files operatively coupled with the second-level register file, the plurality of first-level register files configured to:
  - store instruction operands; and
  - provide the instruction operands to respective execution units of the plurality of execution clusters for use in executing associated instructions.

21. The hierarchical microprocessor of claim 17, wherein the hierarchical microprocessor is configured to:
- execute multiple execution threads using at least the plurality of execution clusters;
- virtualize one or more of the multiple execution threads to create respective virtual threads; and
- execute the respective virtual threads in a time-multiplexed fashion.

22. The hierarchical microprocessor of claim 17, wherein the hierarchical microprocessor is configured to:
- select a youngest matching entry from between or among multiple youngest entries respectively determined for each of the multiple partitions of the plurality of partitions.

* * * * *